(12) United States Patent
Hara et al.

(10) Patent No.: US 7,509,932 B2
(45) Date of Patent: Mar. 31, 2009

(54) CONTROL APPARATUS FOR CONTROLLING INTERNAL COMBUSTION ENGINES

(75) Inventors: Seinosuke Hara, Kanagawa (JP); Tomio Hokari, Kanagawa (JP); Makoto Nakamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 11/545,473

(22) Filed: Oct. 11, 2006

(65) Prior Publication Data

US 2007/0089697 A1 Apr. 26, 2007

(30) Foreign Application Priority Data

Oct. 20, 2005 (JP) .............................. 2005-305770

(51) Int. Cl.
*F01L 1/34* (2006.01)
(52) U.S. Cl. ............... 123/90.15; 123/90.17; 123/90.31
(58) Field of Classification Search .............. 123/90.15, 123/90.17, 90.31
See application file for complete search history.

(56) References Cited

U.S. PATENT DOCUMENTS 6,354,264 B1 * 3/2002 Iwakiri et al. ............... 123/305

FOREIGN PATENT DOCUMENTS

JP 1-315631 A 12/1989

OTHER PUBLICATIONS

Akasaka et al., "Gasoline Engine: Recent Trends in Variable Valve Actuation Technologies to Reduce the Emission and Improve the Fuel Economy," JSAE Journal, vol. 59, No. 2, pp. 33-38, 2005.
Kanai et al., "Reduction of the Engine Starting Vibration for the Parallel Hybrid System," JSAE 9833467, pp. 177-180, May 1998.
Murata et al., "Achievement of Medium Speed and Load Premixed Diesel Combustion with Variable Valve Timing," JSAE Annual Congress, No. 20055167, pp. 17-22, May 18, 2005.
Stokes et al., "Gasoline Engine Operation with Twin Mechanical Variable Life (TMVL) Valvetrain," SAE Paper 2005-01-0752, pp. 1-13, Apr. 11-14, 2005.
Kakuya et al., "Development of Gasoline HCCI Engine Control System (Second Report)," JSAE Annual Congress, No. 20055184, pp. 5-8, May 18, 2005.

* cited by examiner

*Primary Examiner*—Zelalem Eshete
(74) *Attorney, Agent, or Firm*—Foley & Lardner LLP

(57) ABSTRACT

In a control apparatus for controlling a variable valve actuation system employed in an internal combustion engine, engine/vehicle sensors are provided to detect at least a cylinder pressure in an engine cylinder for monitoring a change of state in combustion, arising from fluctuations in states/characteristics of air-fuel mixture such as a change in fuel property. Also provided is a control system that controls the variable valve actuation system responsively to a manipulated variable modified based on the cylinder pressure reflecting the change of state in combustion by a model of combustion.

8 Claims, 10 Drawing Sheets

FIG.2A
FIG.2B
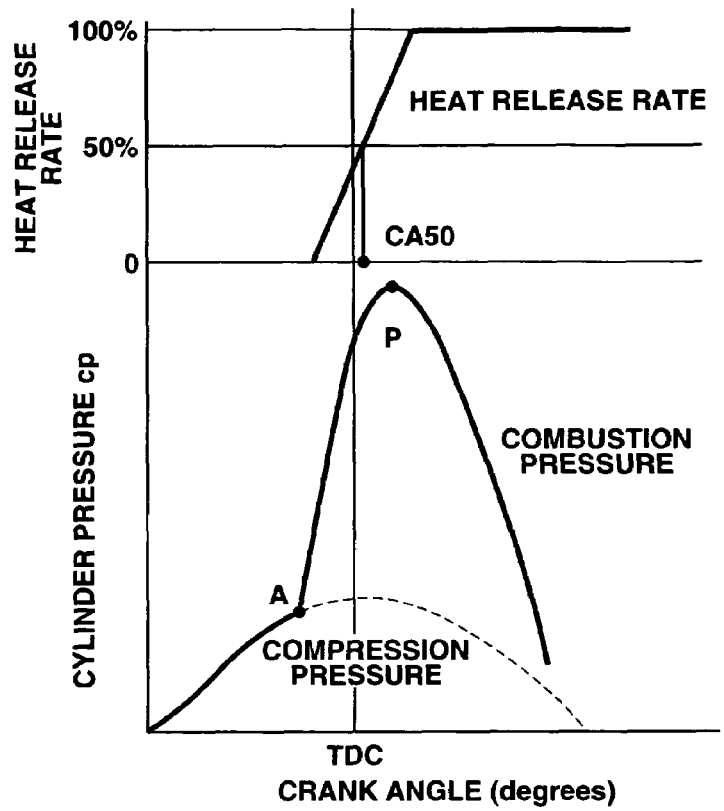
FIG.3
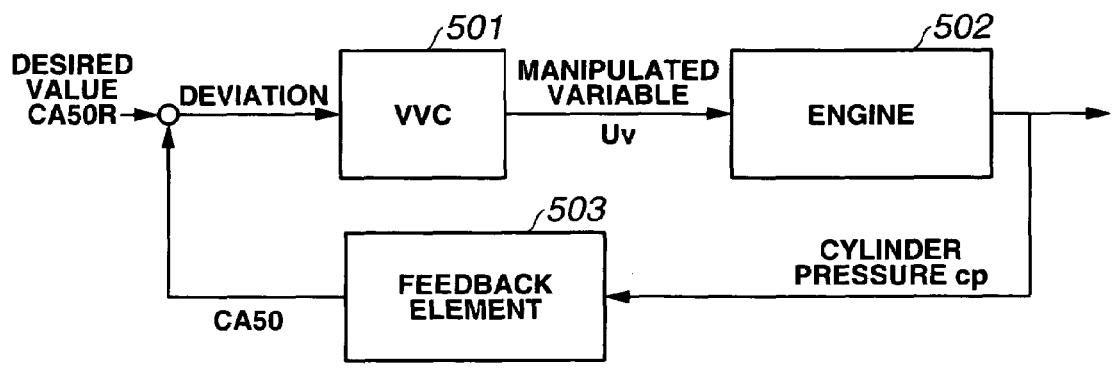

CONTROL APPARATUS FOR CONTROLLING INTERNAL COMBUSTION ENGINES

TECHNICAL FIELD

The present invention relates to an internal combustion engine employing a variable valve actuation control (VVC) system for at least one of intake and exhaust valves, and specifically to the improvement of an engine control technology suited to internal combustion engines such as a four-stroke-cycle gasoline engine, a two-stroke-cycle gasoline engine, a four-stroke-cycle Diesel engine, a two-stroke-cycle Diesel engine, a premix compression ignition engine, and the like.

BACKGROUND ART

In recent years, a variable valve actuation control (VVC) system, capable of variably adjusting a valve lift and valve timing of at least one of intake and exhaust valves of an internal combustion engine depending on engine operating conditions, is widely utilized for controlling a charging efficiency, an effective compression ratio, and an amount of residual gas of the engine, thereby enhancing the combustion performance and engine power performance and exhaust emission control performance. In gasoline engines, the premixed air-fuel mixture is ignited by means of a spark plug. In Diesel engines or premix compression ignition engines, air is compressed during the compression stroke, cylinder, is self-ignited due to a temperature rise of the and then fuel, which is sprayed or injected into the compressed gas (heat produced by compressing the incoming air).

The ignition lag, which controls or manages the state of combustion, changes depending on the temperature and pressure of air-fuel mixture, and various states or various characteristics of air-fuel mixture, for example, a turbulence intensity, and a fuel property. In other words, a deviation of the ignition lag from an optimal value varies depending on the air-fuel mixture temperature, air-fuel mixture pressure, turbulence intensity in the combustion chamber, fuel property, and the like. By means of the VVC system, it is possible to adjust the effective compression ratio, thereby compensating for a deviation of the ignition lag from an optimal value. As a consequence, it is possible to optimally control the state of combustion by means of the VVC system. Note that the effective compression ratio is correlated to a geometrical compression ratio but differs from the geometrical compression ratio. The geometrical compression ratio often denoted by Greek letter "$\epsilon$" is generally defined as a ratio (V1+V2)/V1 of the full volume (V1+V2) existing within the engine cylinder and combustion chamber with the piston at a bottom dead center (BDC) position to the clearance-space volume (V1) with the piston at a top dead center (TDC) position. On the other hand, the effective compression ratio denoted by Greek letter "$\epsilon'$" is generally defined as a ratio of the effective cylinder volume corresponding to the maximum working medium volume to the effective clearance volume corresponding to the minimum working medium volume. These two compression ratios $\epsilon$ and $\epsilon'$ are thermodynamically distinguished from each other. The state of combustion is affected by various factors as well as effective compression ratio $\epsilon'$, for example, the air-fuel mixture temperature, and thermodynamic and hydrodynamic properties or characteristics (boost pressure created by a super-charging system, super-charged air temperature, cooling characteristics in a cooling system, an amount of deposits adhered to the cylinder wall, a fuel injection pattern of one cycle, a swirl intensity of air-fuel mixture, an amount of residual gas, an amount of external EGR (exhaust gas recirculated), and the like). Additionally, for the same intake valve closure timing, the effective compression ratio $\epsilon'$ is affected by several factors, for example the air-fuel mixture temperature at the beginning of compression stroke, the air-fuel mixture pressure at the beginning of compression stroke, and the EGR amount.

There have been proposed effective compression ratio based engine control technologies, for example, an effective compression ratio $\epsilon'$ increase control during an engine starting period for the enhanced ignitability, and an effective compression ratio $\epsilon'$ decrease control after starting for the reduced mechanical friction loss of the engine.

It has already been proposed that, in Diesel engines, effective compression ratio $\epsilon'$ is controlled by variably adjusting an intake valve closure timing depending on engine operating conditions, to optimize the state of combustion. One such combustion control technology with variable valve timing (i.e., with effective compression ratio $\epsilon'$ control) has been disclosed in Japanese document "2005 JSAE Annual Congress, No. 20055167, Yokohama, Japan, May 18, 2005" published by Society of Automotive Engineers of Japan, Inc. and titled "Achievement of Medium Speed and Load Premixed Diesel Combustion with Variable Valve Timing" and written by authors Yutaka Murata et al.

Additionally, there have been proposed and developed methods needed to optimize or fit the control variable in a premixed compression ignition engine model using measured instantaneous gasoline-engine cylinder pressures. One such model-based gasoline engine control technology has been disclosed in United States document "SAE Paper 2005-01-0752, SAE International, Apr. 11-14, 2005" published by Society of Automotive Engineers, Inc. and titled "Gasoline Engine Operation with Twin Mechanical Variable Lift (TMVL) Valvetrain, Stage 1: SI and CAI Combustion with Port Fuel Injection" and written by authors J. Stokes et al.

Furthermore, there have been proposed engine control methods for optimizing or fitting fuel injecting conditions based on a measured value of the state of combustion, such as in-cylinder pressure, in order to compensate for individual differences of variable valve actuation control (VVC) devices manufactured and/or deteriorations of VVC devices with age. One such in-cylinder pressure dependent fuel-injection optimization method has been disclosed in Japanese document "2005 JSAE Annual Congress, No. 20055184, Yokohama, Japan, May 18, 2005" published by Society of Automotive Engineers of Japan, Inc. and titled "Development of a Gasoline HCCI Engine Control System" and written by authors Hiromu Kakuya et al.

As is generally known, it is possible to variably adjust the mass of air entering the engine cylinder at the beginning of the compression stroke by retarding or advancing the intake-valve closure timing, denoted by "IVC" and expressed in terms of crank angle. In such a case, it is possible to retard a rise in in-cylinder pressure and a rise in in-cylinder temperature with respect to a predetermined crank angle. In other words, it is possible to lower effective compression ratio $\epsilon'$ by retarding an in-cylinder pressure rise and/or an in-cylinder temperature rise by way of variable adjustment of intake valve closure timing IVC. One such IVC adjustment type variable compression ratio device for a compression ignition engine has been disclosed in Japanese Patent Provisional Publication No. 1-315631 (hereinafter is referred to as "JP1-315631"). In the case of JP1-315631, the IVC adjustment type variable compression ratio device is exemplified in a two-stroke-cycle Diesel engine. Concretely, when it is determined that the current operating condition of the two-strokecycle Diesel engine corresponds to an engine starting period, intake valve closure timing IVC is phase-advanced towards a timing value near bottom dead center (BDC) by means of an electric-motor driven variable valve operating device (or a motor-driven variable valve timing control (VTC) system), thereby increasing an effective compression ratio and consequently enhancing the self-ignitability during the starting period. In contrast, during engine normal operation, intake valve closure timing IVC is phase-retarded to decrease the effective compression ratio and consequently to reduce a fuel consumption rate. The motor-driven VTC system of JP1-315631 uses a rotary-to-linear motion converter, such as a ball-bearing screw mechanism, for changing relative phase of an intake-valve camshaft to an engine crankshaft. The rotary-to-linear motion converter (the ball-bearing screw mechanism) of JP1-315631 is comprised of a warm shaft (i.e., a ball bearing shaft with helical grooves) driven by a step motor, an inner slider (i.e., a recirculating ball nut), recirculating balls provided in the helical grooves, and an outer slider axially movable together with the inner slider and rotatable relative to the inner slider. The other types of variable valve operating devices have been disclosed in (i) Japanese document "JSAE Journal Vol.59, No. 2, 2005" published by Society of Automotive Engineers of Japan, Inc. and titled "Gasoline Engine: Recent Trends in Variable Valve Actuation Technologies to Reduce the Emission and Improve the Fuel Economy" and written by two authors Yuuzou Akasaka and Hajime Miura, and (ii) Japanese document "Proceedings JSAE 9833467, May, 1998" published by Society of Automotive Engineers of Japan, Inc. and titled "Reduction of the engine starting vibration for the Parallel Hybrid System" and written by four authors Hiroshi Kanai, Katsuhiko Hirose, Tatehito Ueda, and Katsuhiko Yamaguchi. The Japanese document "JSAE Journal Vol.59, No. 2, 2005" discloses various types of variable valve operating systems (various VVC systems), such as a helical gear piston type two-stepped phase control system, a rotary vane type continuously variable valve timing control (VTC) system, a swing-arm type stepped valve lift and working angle variator, a continuously variable valve event and lift (VEL) control system, and the like. The VTC and VEL control systems are operated by means of respective actuators for example electric motors or electromagnets, each of which is directly driven in response to a control signal (a drive signal) from an electronic control unit (ECU). Alternatively, the VTC and VEL control systems are often operated indirectly by means of a hydraulically-operated device, which is controllable electronically or electromagnetically. On the other hand, the Japanese document "Proceedings JSAE 9833467, May, 1998" teaches the use of a variable valve timing control system installed on the intake valve side of an engine of a hybrid vehicle employing a parallel hybrid system, for prevention of rapid engine torque fluctuations, which may occur during engine stop and start operation.

SUMMARY OF THE INVENTION

However, in the prior-art internal combustion engine employing the VVC system, a manipulated variable of the VVC system is not determined based on a detected combustion characteristic value of the internal combustion engine. Therefore, it is impossible to correct or compensate for a deviation of the combustion characteristic value from a desired value (or an optimal value), which deviation may occur owing to a change in fuel property. This leads to reduced engine power output and deteriorated emission control performance.

In the VTC system disclosed in JP1-315631, when there is no application of electric current to the step motor of the VTC system and thus the step motor is de-energized (OFF), intake valve closure timing IVC is automatically controlled to a timing value near bottom dead center (BDC), for example, 20 degrees of crank angle after BDC, under an unfailed condition of the VTC system. Conversely when the step motor is energized (ON), intake valve closure timing IVC is controlled to a timing value retarded from the piston BDC position, for example, 60 degrees of crank angle after BDC. JP1-315631 teaches the phase-advance of intake valve closure timing IVC to a timing value near BDC during the engine starting period, and also teaches the phase-retard of intake valve closure timing IVC after completion of the starting operation. However, according to the system of JP1-315631, the effective compression ratio remains high during cranking, thus resulting in an undesirable drop in cranking speed. That is, the VTC-system manipulated variable (i.e., intake valve closure timing IVC) is set to a fixed value, regardless of the state of combustion. Thus, it is difficult to minimize a deviation of the combustion characteristic value from a desired value.

In the case of the VVC system as disclosed in the Japanese document "JSAE Journal Vol.59, No. 2, 2005", the VVC-system manipulated variable, that is, intake valve closure timing IVC is not phase-retarded from BDC during cranking and cold starting with a starter energized, but set to a fixed value, regardless of the state of combustion. Thus, it is difficult to minimize a deviation of the combustion characteristic value from a desired value.

In the case of the VVC system as disclosed in the Japanese document "Proceedings JSAE 9833467, May, 1998", intake valve closure timing IVC of the starting period is phase-retarded to reduce the quantity of air charged in the engine, thus preventing a rapid rise in torque generated by the engine. However, even after cranking operation, the VVC-system manipulated variable, i.e., intake valve closure timing IVC remains retarded and set to a fixed value, regardless of the state of combustion, thus deteriorating the startability or self-ignitability during start operation. As discussed above, it is difficult to minimize a deviation of the combustion characteristic value from a desired value.

In the case of the combustion control technology with variable valve timing as disclosed in the Japanese document "2005 JSAE Annual Congress, No. 20055167, Yokohama, Japan, May 18, 2005", the VVC-system manipulated variable is set to a fixed value, regardless of the state of combustion. Thus, it is difficult to minimize a deviation of the combustion characteristic value from a desired value.

In the case of the model-based gasoline engine control technology as disclosed in the United States document "SAE Paper 2005-01-0752, SAE International, Apr. 11-14, 2005", the VVC-system manipulated variable and the fuel-injection-system manipulated variable are set independently of each other, regardless of the state of combustion. In other words, the United States document "SAE Paper 2005-01-0752, SAE International, Apr. 11-14, 2005" does not teach cooperative control between the VVC system and the fuel injection system. Thus, it is difficult to minimize a deviation of the combustion characteristic value from a desired value.

Also, in the case of the in-cylinder pressure dependent fuel-injection optimization method as disclosed in the Japanese document "2005 JSAE Annual Congress, No. 20055184, Yokohama, Japan, May 18, 2005", the VVC-system manipulated variable and the fuel-injection-system manipulated variable are set independently of each other, regardless of the state of combustion. In other words, the Japanese document "2005 JSAE Annual Congress, No.

20055184, Yokohama, Japan, May 18, 2005" does not teach cooperative control between the VVC system and the fuel injection system. Thus, it is difficult to minimize a deviation of the combustion characteristic value from a desired value.

As previously discussed, the ignition lag, which controls or manages the state of combustion, changes depending on the temperature and pressure of air-fuel mixture, and various states or various characteristics of air-fuel mixture, for example, a turbulence intensity, and a fuel property. Thus, it would be desirable to provide a means by which a manipulated variable of the VVC system can be optimally controlled, fully taking into account a change in the state of combustion, for example, a change of in-cylinder pressure.

It is, therefore, in view of the previously-described disadvantages of the prior art, an object of the invention to provide a control apparatus for controlling an internal combustion engine employing at least a VVC system, in which a change in the state of combustion is detected, effective compression ratio $\epsilon'$ is adjusted by the VVC system responsively to the detected combustion state change, a deviation of the ignition lag from an optimal value, which deviation may arise from a change in air-fuel mixture temperature, a change in air-fuel mixture pressure, and changes of various states/characteristics of air-fuel mixture (e.g., a change in turbulence intensity, and a change in fuel property), is satisfactorily compensated for, and thus a deviation of the combustion characteristic value from its desired value can be minimized to optimally control combustion in real time.

In order to accomplish the aforementioned and other objects of the present invention, a control apparatus for controlling a variable valve actuation system employed in an internal combustion engine, comprises a sensor that detects a cylinder pressure in a cylinder of the engine, and a control system that controls the variable valve actuation system responsively to a manipulated variable modified based on the cylinder pressure by a model of combustion.

According to another aspect of the invention, an engine system comprises an internal combustion engine having a cylinder, a cylinder pressure sensor that detects a cylinder pressure in the cylinder, and a control system comprising a combustion characteristic model section that sets an actual combustion characteristic value based on the detected cylinder pressure, to output a signal indicative of the actual combustion characteristic value, and a desired-value setting section that sets a desired combustion characteristic value based on engine-and-vehicle operating conditions, to output a signal indicative of the desired combustion characteristic value, wherein said control system controls the engine responsively to a change in the output signal from the desired-value setting section, while using the output signal from the combustion characteristic model section.

According to a further aspect of the invention, a control apparatus for controlling an internal combustion engine, comprises a sensor that detects a cylinder pressure in a cylinder of the engine, and a control system comprising a combustion characteristic model section that sets an actual combustion characteristic value based on the detected cylinder pressure, and an engine manipulated variable setting section that sets an engine manipulated variable based on a desired combustion characteristic value determined based on engine-and-vehicle operating conditions, wherein the control system compensates for an engine control variable based on the actual combustion characteristic value set by the combustion characteristic model section, when the actual combustion characteristic value changes owing to a change in the engine manipulated variable.

According to a still further aspect of the invention, a control apparatus for controlling an internal combustion engine, comprises a sensor that detects at least one combustion characteristic value related to combustion of the engine, and a control system that determines a desired combustion characteristic value based on engine-and-vehicle operating conditions, and controls a manipulated variable of a variable valve actuation system in a manner so as to bring the detected combustion characteristic value closer to the desired combustion characteristic value.

According to another aspect of the invention, a control apparatus for controlling a variable valve timing control (VTC) system of a compression ignition internal combustion engine capable of changing open and closure timings of an engine valve by variably adjusting a phase of a camshaft relative to a crankshaft, comprises engine-and-vehicle sensors that detect at least an angular phase of the crankshaft, an angular phase of the camshaft, and a combustion characteristic value related to a state of combustion of the compression ignition internal combustion engine, and a control system comprising a state estimator that derives an estimated manipulated variable of the VTC system based on the state of combustion, for modifying an actual manipulated variable of the VTC system based on the estimated manipulated variable, the control system configured to initiate phase-retard control for the VTC system at an engine start-up point and to switch to phase-advance control at a point of time when a predetermined cranking speed has been reached and to switch again to phase-retard control for retarding the phase to a predetermined phase angle after fuel sprayed in a cylinder of the compression ignition internal combustion engine has been ignited, while observing the state of combustion.

According to another aspect of the invention, a control apparatus for controlling an internal combustion engine, comprises a sensor that detects a cylinder pressure in a cylinder of the engine, and a control system comprising an engine model section that sets an actual combustion characteristic value based on the detected cylinder pressure and sets a desired combustion characteristic value based on engine-and-vehicle operating conditions, and calculates a deviation of the actual combustion characteristic value from the desired combustion characteristic value, and an engine manipulated variable setting section that sets at least one engine manipulated variable based on the desired combustion characteristic value, and the control system modifying the engine manipulated variable based on the deviation between the actual combustion characteristic value and the desired combustion characteristic value, when the actual combustion characteristic value changes owing to a change in the engine manipulated variable.

The other objects and features of this invention will become understood from the following description with reference to the accompanying drawings.

BRIEF DESCRIPTION OF THE DRAWINGS

FIG. 2A is a characteristic diagram illustrating the relationship between a crank angle and a heat release rate (one of combustion characteristic values) in the control apparatus of the embodiment.

FIG. 2B is a characteristic diagram illustrating the relationship between a crank angle and a cylinder pressure (one of combustion characteristic values) in the control apparatus of the embodiment.

FIG. 3 is a block diagram illustrating the control apparatus of the embodiment, whose control system uses a combustion characteristic value calculated by means of a feedback element.

DESCRIPTION OF THE PREFERRED EMBODIMENTS

Figure 1:
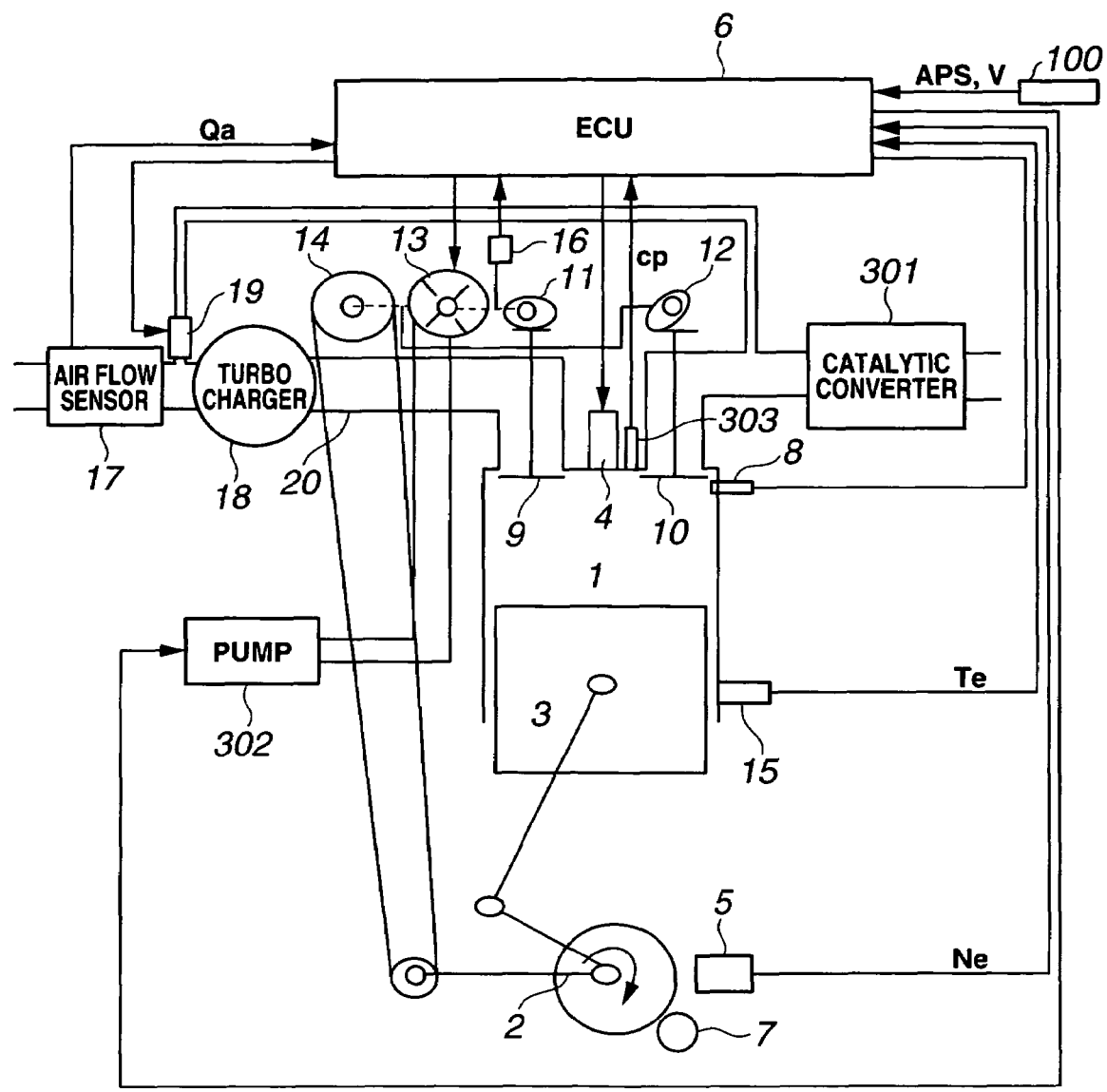
FIG. 1 is a system block diagram illustrating an embodiment of a control apparatus for controlling an internal combustion engine employing at least a variable valve actuation control (VVC) system and an electronic engine control system.

Referring now to the drawings, particularly to FIG. 1, the variable valve actuation control system (simply, a VVC system, or a variable valve actuation system) incorporated in the internal combustion engine control apparatus of the embodiment is exemplified in a four-stroke-cycle engine. As indicated by the arrow in the system block diagram of FIG. 1, a crankshaft 2 of an engine 1 rotates clockwise. As is generally known, a piston position at which a reciprocating piston 3 has moved to the bottom of the cylinder of engine 1, corresponds to 180 degrees of crank angle. The lowest piston position is called "bottom dead center (BDC)". A piston position obtained when engine crankshaft 2 further rotates and thus piston 3 has reached the top of the engine cylinder, corresponds to 360 degrees of crank angle (360° crank angle) or 0° crank angle. The highest piston position is called "top dead center (TDC)".

In the case of usual diesel combustion, diesel fuel (fuel oil) is sprayed or injected via a fuel injection valve 4 into the cylinder during the compression stroke. Then, the sprayed fuel is self-ignited and combusted due to the high-temperature high-pressure compressed gas (heat produced by compressing the incoming air). On the other hand, in the case of premix compression ignition, fuel is sprayed or injected via fuel injection valve 4 into the cylinder during the intake stroke so that the sprayed fuel is sufficiently premixed with air charged in the cylinder. Residual gas is set to a comparatively large amount for a temperature rise in air-fuel mixture. When piston 3 moves up, a temperature rise and a pressure rise in premixed air-fuel mixture occur, thereby resulting in spontaneous ignition of the air-fuel mixture so that the mixture is combusted. A fuel injection amount and injection timing of fuel injection valve 4 included in the electronic injection control system are both controlled, responsively to a sensor signal from a crank angle sensor 5, by means of an electronic control unit (ECU) 6. The purpose of crank angle sensor 5 is to inform the ECU 6 of engine speed Ne as well as the relative position of crankshaft 2.

In the case of gasoline premixed combustion, under a specific engine operating condition where compression ignition is difficult, air-fuel mixture is secondarily ignited by means of a spark plug (not shown), so that combustion develops according to flame propagation. In spark-ignition internal combustion engines, the ignition timing of the spark plug is controlled, responsively to a sensor signal from crank angle sensor 5, by means of electronic control unit (ECU) 6.

During start operation, an engine starter 7 is operated to crank the engine 1 or to turn the crankshaft 2. In the case of a hybrid-vehicle engine, rather than using starter 7, engine 1 is rotated by means of a motor generator. Additionally, during the starting period, an electric current is applied to a glow plug 8 for a temperature rise in glow plug 8 and for promotion of vaporization of fuel, thus supporting or assisting spontaneous ignition. Harmful exhaust emission gases such as carbon monoxide (CO), hydrocarbons (HCs), soot, nitrogen oxides (NOx), and the like, are filtered out and purified by means of a catalytic converter 301.

An intake valve 9 and an exhaust valve 10 are installed in the upper part of engine 1. Intake valve 9 is driven by an intake cam 11, whereas exhaust valve 10 is driven by an exhaust cam 12. Intake cam 11 is mechanically linked via a variable valve actuation mechanism (or a variable valve characteristic adjustment mechanism) 13 to a camshaft timing pulley 14. In the embodiment shown in FIG. 1, a hydraulically-operated rotary vane type variable valve timing control (VTC) mechanism or a motor-driven spiral disk type VTC mechanism (see FIG. 19) or an electric-motor actuated helical-spline type VTC mechanism (see FIG. 20) is used as variable valve actuation mechanism 13. In lieu thereof, a continuously variable valve event and lift control (VEL) mechanism (see the valve event and lift characteristic shown in FIG. 14) may be used as variable valve actuation mechanism 13. As the variable valve actuation control (VVC) system, the VTC mechanism and the VEL mechanism may be combined with each other.

Rotation of crankshaft 2 is transmitted via a timing belt, a timing chain or the like to camshaft timing pulley 14. In the shown embodiment, exhaust cam 12 is linked directly to camshaft timing pulley 14. Alternatively, exhaust cam 12 may be linked to camshaft timing pulley 14 through the VTC mechanism 13 for intake cam 11. In lieu thereof, exhaust cam 12 may be linked to camshaft timing pulley 14 through a separate VTC mechanism differing from the VTC mechanism 13 associated with intake cam 11.

A sensor signal from an engine temperature sensor (a water temperature sensor or an engine coolant temperature sensor) 15, which detects engine temperature Te, is input into ECU 6. A sensor signal 11s from a camshaft sensor 16 of the VTC mechanism is also input into ECU 6. Camshaft sensor 16 is located near the intake camshaft associated with intake cam 11. Camshaft timing pulley 14 is driven by the engine crankshaft at ½ the revolution speed of crankshaft 2. In the variable valve actuation control (VVC) system of FIG. 1, intake cam 11 is rotated with a phase difference between an angular phase detected by crank angle sensor 5 and an angular phase detected by camshaft sensor 16. The valve-opening action of intake valve 9 is performed once for each two revolutions of crankshaft 2, for entry of air into the cylinder.

During rotation of camshaft timing pulley 14, exhaust cam 12 linked to camshaft timing pulley 14 is also driven. The valve-opening action of exhaust valve 12 is performed once for each two revolutions of crankshaft 2, for exhausting burned gas from the engine cylinder. As can be seen from the left-hand side of FIG. 1, an airflow sensor 17, a turbo charger 18 included in the super-charging system, and an exhaust gas recirculation (EGR) valve 19 are installed in an induction system 20 and arranged upstream of intake valve 9. Airflow sensor 17 is provided for measuring the quantity Qa of air entering the engine cylinder, that is, the air mass flow rate. As the other engine/vehicle sensors 100, there are an accelerator position sensor, a vehicle speed sensor provided to detect vehicle speed V, and the like. As input information indicative of engine load L, the input interface of ECU 6 receives a sensor signal from the accelerator position sensor that detects an amount APS of depression of an accelerator pedal.

Variable valve actuation mechanism 13 (or the VTC mechanism incorporated in the engine control apparatus of the embodiment shown in FIG. 1) is a variable phase control means, which is operable simultaneously with cranking operation of engine 1. In the case that the VVC system employs the hydraulically-operated rotary vane type variable valve timing control (VTC) mechanism, as a matter of course, the VTC mechanism is operated by hydraulic pressure produced by an oil pump of engine 1, and therefore the hydraulic pressure produced by the engine oil pump tends to drop during cranking operation. Due to such a drop in the supplied hydraulic pressure, the VVC system (or the VTC mechanism) has uncertainty in controlling the valve timing (IVC and/or IVO) of intake valve 9. under a particular condition where the VVC system (or the VTC mechanism) has uncertainty in controlling the valve timing due to a drop in hydraulic pressure produced by the engine oil pump, for example, during cranking, a separate electric-motor driven hydraulic oil pump 302 is driven simultaneously with the ignition-switch turn-ON operation so as to quickly satisfactorily feed or deliver hydraulic pressure to the VTC mechanism.

Also installed on engine 1 is an in-cylinder pressure sensor (simply, a cylinder pressure sensor) 303. Cylinder pressure sensor 303 is attached to the engine cylinder, for detecting an in-cylinder pressure value (simply, a cylinder pressure value) cp. A sensor signal from cylinder pressure sensor 303 is input into ECU 6. As seen in FIG. 2B, under a condition where any combustion does not occur, cylinder pressure cp, detected or measured by cylinder pressure sensor 303, continues to rise due to the air-fuel mixture compressed in the cylinder, until piston 3 reaches the piston TDC position. After piston 3 passes TDC, the air-fuel mixture begins to expand. As can be seen from the compression pressure characteristic indicated by the phantom line in FIG. 2B, cylinder pressure cp becomes maximum at TDC under the condition where any combustion does not occur. On the contrary, when the air-fuel mixture is burned, as can be seen from the combustion pressure characteristic indicated by the solid line in FIG. 2B, the air-fuel mixture is ignited at the point "A" to initiate combustion, and then cylinder pressure cp begins to rapidly rise from the point "A". Thus, piston 3 works by the increasing cylinder pressure cp. After TDC, cylinder pressure cp tends to gradually fall.

The integrated value of the difference between combustion pressure and compression pressure during one engine operating cycle corresponds to a work of engine 1. Fuel injection timing control and ignition timing control are executed in such a manner as to effectively increase the difference between combustion pressure and compression pressure. However, assuming that an excessive combustion pressure rise takes place, there is an increased tendency for undesirable engine knock to occur. Thus, the fuel injection timing and the ignition timing are both controlled to maximize the work of engine 1 without any knock or detonation (uncontrollable second explosion). Additionally, from a demand for exhaust emission control (e.g., the reduced concentration of nitrogen oxides (NOx)), the maximum work has limitation.

A heat release rate shown in FIG. 2A is used to evaluate or estimate the state of combustion. The heat release rate can be arithmetically calculated based on cylinder pressure cp. When a crankangle CA50, at which the heat release rate becomes 50%, is excessively early, there is an increased tendency for undesirable engine knock to occur. Conversely when the crankangle CA50 is excessively late, combustion tends to slow down. In the case of either the excessively early crankangle CA50 or the excessively late crankangle CA50, the thermal efficiency tends to drop.

The combustion characteristic value relates to the ignition lag. According to the control apparatus of the embodiment, (i) controlled variables concerning opening and closing operations of intake and exhaust valves 9 and 10, that is, intake valve timings IVO and IVC and exhaust valve timings EVO and EVC and/or (ii) valve lift characteristics, in particular, intake valve lift characteristics are controlled so that the combustion characteristic value actually detected is adjusted or brought closer to a desired value determined based on engine operating conditions.

Concretely, there are the following combustion characteristic values.
(1) A Peak Pressure (cylinder pressure cp at the point "P" in FIG. 2B)
(2) A Phase of Peak Pressure (crankangle at the point "P")
(3) A Maximum Value of A Cylinder Pressure Buildup Rate
(4) A Crankangle at which A Cylinder Pressure Buildup Rate becomes maximum
(5) A Indicated Mean Effective Pressure (a work)
(6) A Combustion Starting Point (the point "A" in FIG. 2B)
(7) A Crankangle CA5, at which a heat release rate becomes 5%, A Crankangle CA50 (see the crankangle position denoted by "CA50" in FIG. 2A), at which a heat release rate becomes 50%, and A Crankangle CA95, at which a heat release rate becomes 95%
(8) A Maximum Heat Release Rate
(9) Boost Pressure in Super-charging System
(10) Knock Index (the integrated value of inverse number of self-ignition lag of sprayed fuel)

As the control parameters, directly participating in combustion stability, the following parameters as well as cylinder pressure cp are exemplified.
(a) Vibrations of Cylinder Head, caused by Gas Vibrations of controlled or uncontrolled burning
(b) Rotational-speed Fluctuations in Crankshaft
(c) Ionic Current arising from Combustion
(d) Emission Intensity of Flame It is possible to derive or estimate the combustion characteristic value from the previously-noted parameters. The VVC system of the control apparatus of the embodiment is controlled to bring thee previously-discussed combustion characteristic values closer to their desired values.

Referring now to FIG. 3, there is shown the block diagram for variable valve actuation control of the VVC system, executed within ECU 6 of the control apparatus of the embodiment to optimize combustion, thereby enabling enhanced engine power output and reduced exhaust emissions. A block denoted by reference sign 502 is an engine, a block denoted by reference sign 501 is a variable valve actuation control (VVC) system, and a block denoted by references sign 503 is a feedback element (or a combustion characteristic model). As can be seen from the block diagram of FIG. 3, cylinder pressure cp in the engine cylinder is detected, the detected cylinder pressure is input into feedback element 503 to derive or compute an actual crankangle CA50, at which a heat release rate becomes 50%. Within the feedback element 503, actual crankangle CA50 is compared to a desired crankangle CA50R, which is determined based on the latest up-to-date information concerning engine-and-vehicle operating conditions, to calculate a deviation of actual crankangle CA50 from desired crankangle CA50R. The deviation is input into the VVC system 501. Within the block 501, a VVC-system manipulated variable Uv, such as intake valve closure timing IVC, is determined based on the deviation (i.e., the error signal) between CA50 and CA50R. Responsively to the determined VVC-system manipulated variable Uv, i.e., the determined IVC, the VTC mechanism of the VVC system is actuated. As a result of this, actual crankangle CA50 of engine 502 is suitably controlled or adjusted to desired crankangle CA50R, and therefore it is possible to correct or compensate for a deviation of the actual heat release rate from its desired rate, which deviation may occur owing to various states/characteristics of air-fuel mixture, for example a mixture temperature, a mixture pressure, and a fuel property. This enables reduced exhaust emissions and enhanced engine power output.

As discussed above, in the control apparatus of the embodiment shown in FIG. 3, feedback element 503 calculates at least one actual combustion characteristic value (i.e., actual crankangle CA50) based on cylinder pressure cp of engine 502, and thereafter the VVC-system manipulated variable Uv is determined by the block 501 (the VVC system). In such a case, a delay in a control system's responsiveness exists. In particular, in a transient operating state, there is a possibility that the deviation of actual crankangle CA50 from desired crankangle CA50R cannot be eliminated adequately.

Figure 4:
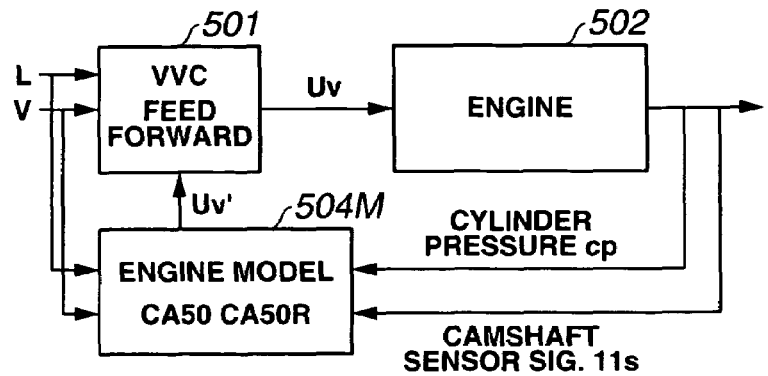
FIG. 4 is a block diagram illustrating the control apparatus of another embodiment, whose control system has an engine model (a dynamic compensator) computing an estimated or anticipated VVC-system manipulated variable Uv', fully taking into account a state of combustion.

To avoid this, the control system shown in FIG. 4 further includes a dynamic compensator (dynamic compensation means), such as an engine model 504M (i.e. a model of combustion in the engine or a combustion characteristic model). Additionally, the VVC block 501 has a feedforward control function. On the basis of a deviation between actual crankangle CA50 and desired crankangle CA50R, engine model 504M estimates or predicts or anticipates a VVC-system manipulated variable suitable for engine load L (e.g., the amount APS of depression of the accelerator pedal) and vehicle speed V which may be read at the next control cycle. The anticipated VVC-system manipulated variable Uv', reflecting the deviation between CA50 and CA50R, is input into the VVC block 501. Therefore, without any control system's response delay for a change in engine load L (a change in accelerator-pedal depression amount APS) and a change in vehicle speed V, it is possible to precisely determine an anticipating correction signal value of VVC-system manipulated variable Uv and to output the anticipating correction signal value indicative of the properly corrected VVC-system manipulated variable in real time. This enhances the control system's adaptability in a transient operating state of the engine.

In the case of engine model 504M shown in FIG. 4, serving as a dynamic compensator (dynamic compensation means), a control algorithm is described or defined as a mathematical model. In lieu thereof, an engine control variable may be described or retrieved by a two-dimensional look-up table showing how the control variable has to be varied relative to engine load L and vehicle speed V.

Figure 5:
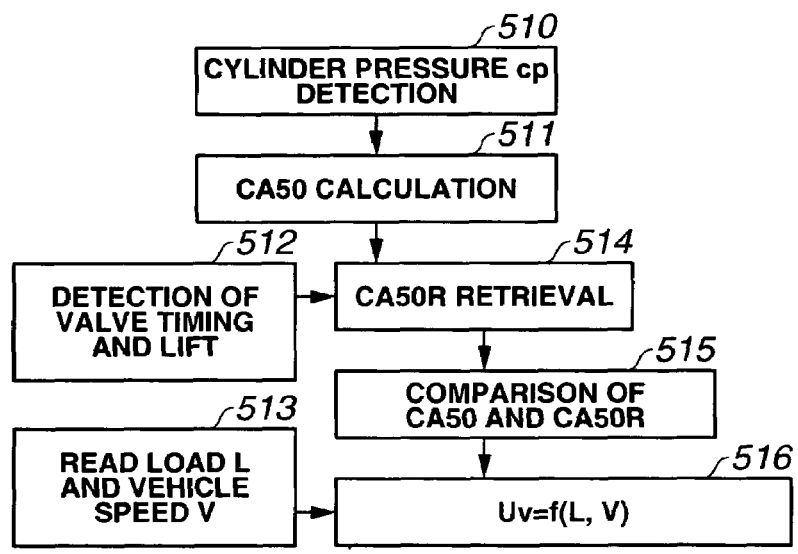
FIG. 5 is an explanatory drawing for arithmetic and logic operations executed by the control system shown in FIG. 4.

Referring now to FIG. 5, there are shown the arithmetic and logic operations executed within engine model 504M of the control system of FIG. 4.

At step 510, cylinder pressure (in-cylinder pressure) cp is detected.

At step 511, actual crankangle CA50, at which a heat release rate becomes 50%, is arithmetically calculated or computed based on the detected cylinder pressure cp.

At step 512, a valve timing and a valve lift for intake valve 9 are detected or determined based on sensor signal 11s from camshaft sensor 16.

At step 513, the latest up-to-date information about engine load L (accelerator-pedal depression amount APS) and vehicle speed V is read.

At step 514, desired crankangle CA50R is retrieved based on the detected valve timing and valve lift (see step 512) from a preprogrammed look-up table showing how desired crankangle CA50R has to be varied relative to a valve timing and lift characteristic.

At step 515, actual crankangle CA50, calculated through step 511, is compared to desired crankangle CA50R, retrieved through step 514.

At step 516, a function Uv=f(L, V) used to determine VVC-system manipulated variable Uv based on information about engine load L and vehicle speed V, is modified or compensated for on the basis of the comparison result (i.e., the deviation) of CA50 and CA50R. The aforementioned function Uv=f(L, V) is installed in engine model 504M in terms of a mathematical expression. According to the control system of FIGS. 4-5, the function Uv=f(L,V) can be modified or compensated for in real time on the basis of information (the comparison result of CA50 and CA50R) obtained through step 515. And thus, the anticipated value (or the predicted value) of VVC-system manipulated variable Uv, suitable for engine load L (accelerator-pedal depression amount APS) and vehicle speed V, which may be read at the next control cycle, can be set such that actual crankangle CA50 (the actual combustion characteristic value) is smoothly brought closer to the desired value (desired crankangle CA50R) to properly eliminate the deviation (the error) between actual crankangle CA50 and desired crankangle CA50R even in a transient engine/vehicle operating state.

In other words, the arithmetic and logic operations of FIG. 5 are regarded as a state observer or a state estimator that derives an estimated engine manipulated variable, in particular, an estimated VVC-system manipulated variable Uv' based on the state of combustion, detected by engine-and-vehicle sensors.

In the shown embodiments, VVC-system manipulated variable Uv is arithmetically calculated as the function Uv=f(L, V) of two parameters, namely, engine load L and vehicle speed V. Instead of using the function, VVC-system manipulated variable Uv may be retrieved based on information about engine load L and vehicle speed V from a two-dimensional look-up table (or a two-dimensional characteristic map) how VVC-system manipulated variable Uv has to be varied relative to engine load L and vehicle speed V. Also in such a table-retrieval, for the purpose of dynamic compensation, a L-V-Uv characteristic of the table has to be modified in real time based on information (the comparison result of CA50 and CA50R) obtained through step 515.

Figure 6:
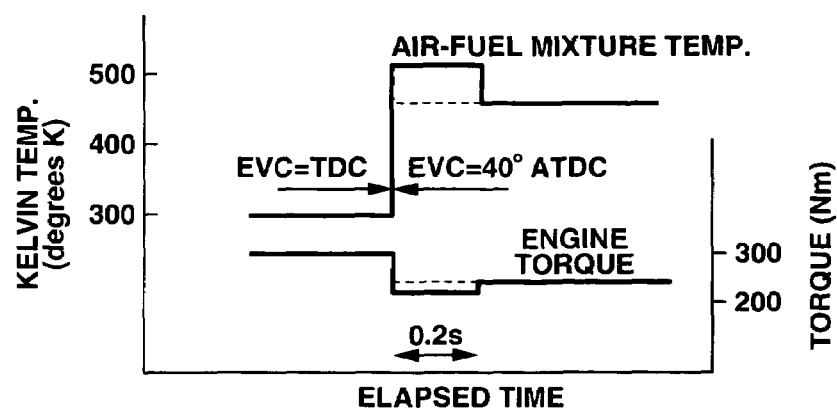
FIG. 6 is a time chart illustrating variations of air-fuel mixture temperature and engine torque, arising from exhaust valve closure timing (EVC) varied stepwise.

Referring to FIG. 6, there is shown variations of air-fuel mixture temperature and engine torque at early stages of compression, obtained when exhaust valve closure timing EVC has been changed stepwise from TDC to 40 degrees ATDC. The mixture temperature obtained for the early time interval (e.g., 0.2 seconds) just after stepwise-changed to 40 degrees ATDC is affected by the previous engine operating cycle, and thus this temperature becomes a comparatively higher temperature value as indicated by the solid line in FIG. 6, as compared to a later steady-state temperature value. Owing to such higher temperatures just after stepwise-changed to 40 degrees ATDC, there is an increased tendency for engine knock to occur, and thus engine torque tends to drop for the early time interval (e.g., 0.2 seconds) just after stepwise-changed to 40 degrees ATDC.

As discussed above, there is a possibility that the deviation of the actual combustion characteristic value (e.g., CA50) and its desired value (e.g., CA50R) cannot be properly eliminated in the transient operating state and an undesirable delay in the control system's responsiveness exists. On the other hand, in the case of the dynamic-compensator equipped control system shown in FIG. 4 in which engine model 504M is added as the dynamic compensator, such a deviation of CA50 and CA50R can be predicted. That is, on the basis of engine/vehicle operating conditions indicative parameters (e.g., accelerator-pedal depression amount APS and/or vehicle speed V), it is possible to predictably determine a VVC-system manipulated variable that the deviation (the error) of CA50 and CA50R may be adjusted to zero. Thus, in the case of the dynamic-compensator equipped control system of FIGS. 4-5, as indicated by the phantom line in FIG. 6, it is possible to avoid a temporary rise in air-fuel mixture temperature and a temporary drop in engine torque.

The combustion stability of engine 1 is generally affected by various factors, such as engine temperature Te (coolant temperature), fuel property (a fuel's cetane number indicating the ignitability of a fuel to ignite quickly after injected into the engine cylinder), intake air temperature, residual gas rate, EGR (exhaust gas recirculated), boost pressure, and the like. The previously-described combustion characteristic values, for example, peak cylinder pressure, crankangle CA50, maximum heat release rate, boost pressure, and knock index, are pre-measured for engine speeds Ne and engine loads L after completion of engine warm-up. The pre-measured combustion characteristic values (target or desired combustion characteristic values) are pre-stored in engine model 504M of FIG. 4. The control system determines that combustion has reached a stable state when the actual combustion characteristic values approach closer to their pre-measured characteristic values (target combustion characteristic values). For instance, in Diesel engines, when the processor of ECU 6 determines, based on the comparison results of actual combustion characteristic values and their pre-measured combustion characteristic values (target combustion characteristic values), that the stable combustion state has been reached, it is possible to timely inhibit forcible phase-advance of the VTC mechanism of the starting period and thus to timely initiate VTC phase-retard control. As a result of this, the engine performance of the starting period can be improved, and additionally the fuel economy after warm-up can be enhanced. At this time, desired values (or specified values) for control parameters, participating in combustion (combustion stability) and suited to the VTC phase-advance state, have to be pre-installed or pre-measured for the controlled engine, and then the pre-measured control parameters (the pre-measured desired values) have to be pre-stored in engine model 504M of FIG. 4. These pre-measured control parameters, participating in combustion, are also used for fuel-injection quantity control and injection timing control.

Figure 7:
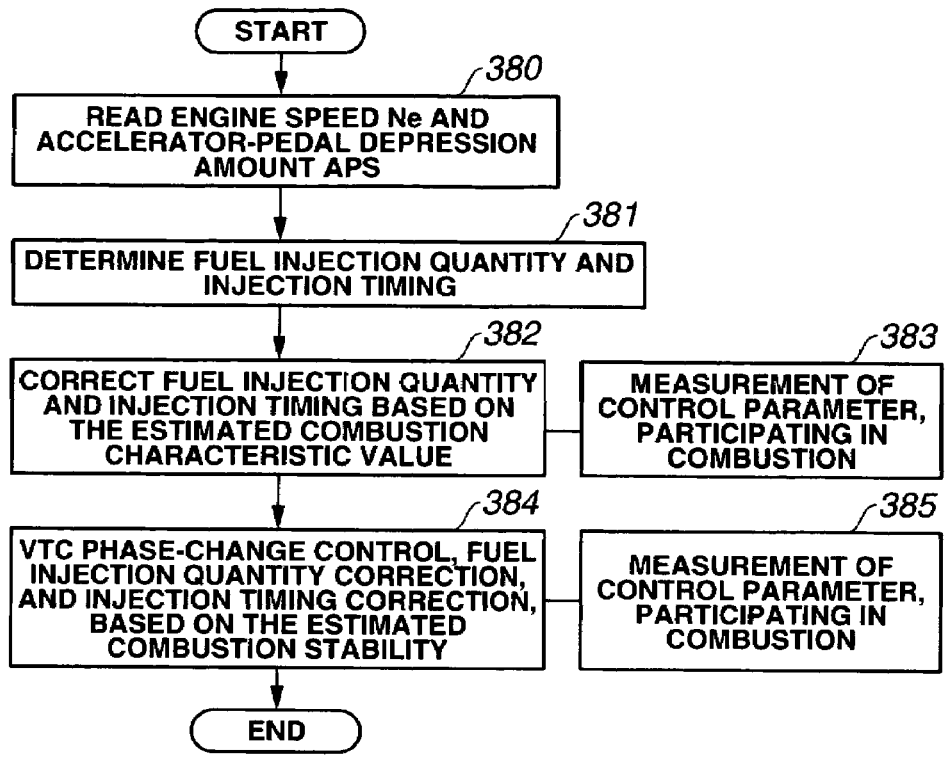
FIG. 7 is a flow chart illustrating a control routine for a variable valve timing control (VTC) mechanism of the VVC system incorporated in the control apparatus of the embodiment.

Referring to FIG. 7, there is shown the control routine for the VTC mechanism of the VVC system of the control apparatus of the embodiment. The control routine is executed as time-triggered interrupt routines to be triggered every predetermined time intervals such as 10 milliseconds.

At step 380, the latest up-to-date informational data about engine speed Ne and accelerator-pedal depression amount APS (regarded as engine load L) are read.

At step 381, a fuel injection quantity and injection timing are determined based on engine speed Ne and accelerator-pedal depression amount APS (engine load L).

At step 382, a combustion characteristic value is computed or estimated based on a result of measurement of a control parameter, participating in combustion, such as combustion pressure, measured or derived through step 383. The fuel injection quantity and injection timing, determined through step 381, are corrected based on the estimated combustion characteristic value.

At step 383, the control parameter, participating in combustion, such as combustion pressure, is measured.

At step 384, a combustion stability is determined or estimated based on a result of measurement of a control parameter, participating in combustion, such as combustion pressure, measured or derived through step 385. VTC phase-change control (VTC phase-advance/phase-retard control) and fuel injection quantity correction and injection timing correction are performed based on the estimated combustion stability.

At step 385, the control parameter, participating in combustion, such as combustion pressure, is measured.

As set forth above, even in the presence of a change in fuel property, it is possible to adapt each of the fuel injection quantity, injection timing, and engine valve timings (in particular, intake valve timings IVO and IVC) to a state change of engine 1, thus enabling reduced exhaust emissions and preventing the generation of soot. Additionally, VTC phase-change control (VTC phase-advance control as well as VTC phase-retard control) can be adapted to the still varying combustion stability of engine 1 in real time.

Figure 8:
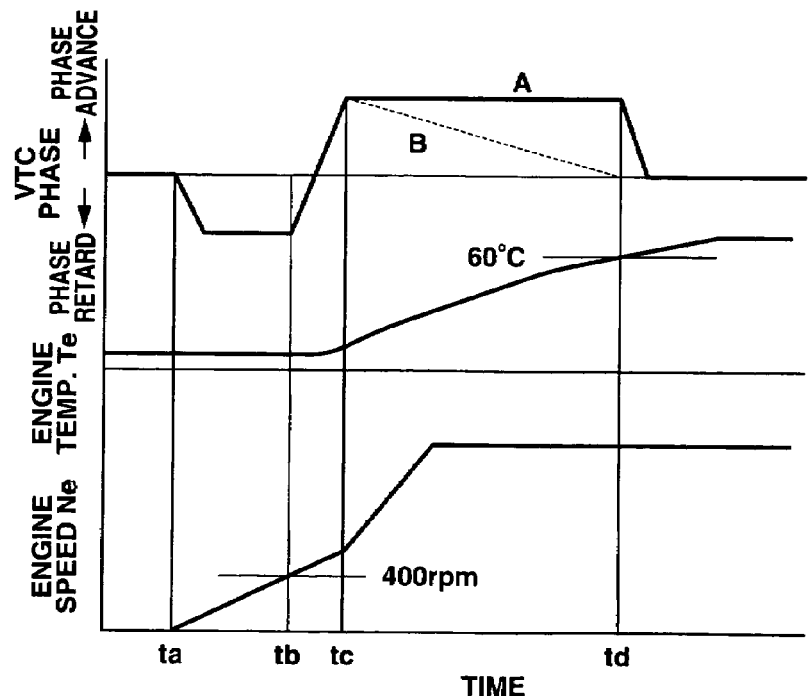
FIG. 8 shows one phase-control characteristic of the VVC system incorporated in the control apparatus of the embodiment, for a water temperature change and an engine speed change.

Referring now to FIG. 8, there is shown a phase-control characteristic for the VTC mechanism of the control apparatus of the embodiment during a cranking and starting period. At the time ta (an engine start-up point) at which the engine starter becomes energized (ON), the phase of variable valve actuation mechanism 13 (hereinafter referred to as "VTC phase") is retarded from a phase suited to normal engine operation of engine 1. Concretely, intake valve closure timing IVC is phase-retarded from BDC during cranking. As a result, effective compression ratio $\epsilon'$ is lowered, thus reducing the compression pressure, in other words, the work of compression. This contributes to the increased cranking speed and enhanced startability. At the time tb at which the cranking speed begins to exceed 400 rpm, the VTC phase (that is, intake valve closure timing IVC) is advanced so that effective compression ratio $\epsilon'$ becomes raised, and thus in-cylinder gas temperature becomes high. As a result, the ignitability can be enhanced, thus enabling the engine to be easily ignited. Thereafter, at the time tc at which the VTC phase becomes the phase substantially corresponding to the maximum phase-advance state, fuel injection starts. At the time tc, by virtue of the high effective compression ratio and high temperature gas, the injected fuel (the compressed air-fuel mixture) is certainly combusted or ignited. Owing to the combustion energy, a rapid rise in engine speed Ne occurs just after the time tc, and engine speed Ne reaches a specified idling speed for example 600 rpm. At the same time, in order to adjust the fuel-injection quantity, the electronic fuel injection system is controlled by means of ECU 6 of FIG. 1, such that engine speed Ne is maintained at the specified idling speed. At the time td, the processor of ECU 6 determines that engine warm-up has been completed, and thus the VTC phase-advance control is stopped so as to lower the effective compression ratio. This contributes to the reduced mechanical friction loss of engine 1 and enhanced net thermal efficiency. In the conventional engine control system, an engine warm-up state change (or a combustion state change) is not fully taken into account. Thus, the conventional control system operates to hold the phase-advance state for the time period from the time tc to the time td (see the A characteristic curve indicated by the solid line in FIG. 8). This causes an extra energy loss. In contrast, according to the control apparatus of the embodiment, as can be appreciated from the B characteristic curve of FIG. 8, it is possible to avoid extra phase-advance control by executing phase-retard control adapted to a combustion stability.

Returning to FIG. 8, at the time td at which a stable combustion state has been reached, for example, when the engine temperature (engine coolant temperature) exceeds 60° C., according to the A characteristic curve indicated by the solid line in FIG. 8, the VTC phase is controlled or adjusted from the phase substantially corresponding to the maximum phase-advance state in the phase-retard direction (that is, toward a phase suited to the normal engine operation of engine 1) to avoid the phase-advance state. According to the VTC phase control based on the B characteristic curve of FIG. 8, during the warm-up time period tc-td from tc to td, the VTC phase (i.e., intake valve closure timing IVC) can be retarded gradually to the phase suited to the normal engine operation of engine 1, fully taking into account a change in combustion stability (or a combustion state change). As can be seen from the VTC phase control characteristic of FIG. 8, after completion of engine warm-up, it is preferable that the VTC phase is set to an intermediate phase, which is phase-advanced from the VTC phase suited for the early stage (see the time period ta-tb in FIG. 8) of engine cranking and phase-retarded from the maximum phase-advanced VTC phase of the starting and warm-up period (in particular, see the warm-up time period tc-td in FIG. 8). By way of the proper setting of the VTC phase (i.e., the previously-noted intermediate phase) suited after completion of engine warm-up, it is possible to properly lower the effective compression ratio to such an extent that does not cause any trouble in combustion, thereby effectively lowering the work of compression and ensuring a reduction in mechanical friction loss of engine 1, a decrease in fuel consumption rate (improved fuel economy), and reduced NOx (nitrogen oxides) emissions. Additionally, by virtue of the properly lowered effective compression ratio after engine warm-up, it is possible to effectively reduce a peak value of combustion pressure, thereby ensuring a reduction in combustion noise and vibrations. From the time td after completion of engine warm-up, intake valve closure timing IVC is optimally controlled usually by way of closed-loop control depending on engine operating conditions such as engine speed Ne and engine load L (accelerator-pedal depression amount APS).

Figure 9:
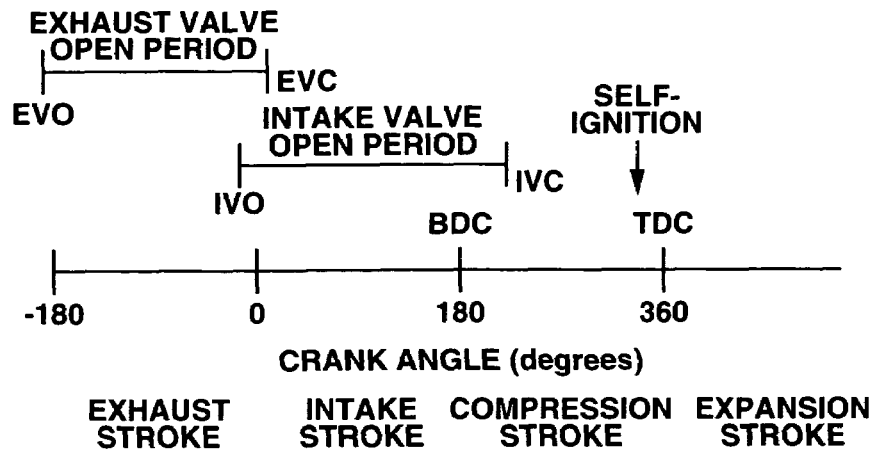
FIG. 9 is a diagram of intake valve open timing (IVO), intake valve closure timing (IVC), exhaust valve open timing (EVO), and exhaust valve closure timing (EVC) in a four-stroke-cycle internal combustion engine to which the control apparatus of the embodiment is applicable.

Referring now to FIG. 9, there are shown the timings IVO and IVC of intake valve 9 and the timings EVO and EVC of exhaust valve 10 during normal engine operation in a four-stroke-cycle compression ignition engine, such as a four-stroke-cycle Diesel engine. Exhaust valve 10 starts to open substantially at minus 180 degrees of crank angle at the beginning of exhaust stroke. The timing where exhaust valve 10 starts to open is called as "exhaust valve open timing EVO". Exhaust valve 10 starts to close at the end of exhaust stroke. The timing where exhaust valve 10 starts to close is called as "exhaust valve closure timing EVC". On the other hand, intake valve 9 starts to open at a timing value near 0° crank angle at the beginning of intake stroke. The timing where intake valve 9 starts to open is called as "intake valve open timing IVO". Intake valve 9 starts to close at a timing value near BDC (corresponding to 180 degrees of crank angle) at the end of intake stroke. The timing where intake valve 9 starts to close is called as "intake valve closure timing IVC". Diesel fuel (fuel oil) is sprayed or injected into the cylinder at the end of compression stroke. Self-ignition of the sprayed fuel occurs before or after TDC (corresponding to 360 degrees of crank angle). When intake valve closure timing IVC is phase-advanced from BDC, the quantity of gas (air) charged in the cylinder tends to reduce, thus resulting in a reduced effective compression ratio. Conversely when intake valve closure timing IVC is phase-retarded from BDC, reflux of gas (air), charged into the cylinder once, back to induction system 20 occurs, and thus the mass of gas charged into the cylinder is reduced, thereby resulting in a reduced effective compression ratio.

To improve the exhaust emission performance in Diesel engines, the use of a large amount of residual gas is very advantageous and effective to properly retard the combustion velocity, thus creating the uniformly blended air-fuel mixture and suppressing the generation of soot and NOx emissions. As a method to feed a large amount of residual gas into the engine cylinder, it is effective to increase the opening of EGR valve 19 of FIG. 1. Alternatively, in order to increase the rate of residual gas in the engine cylinder, exhaust valve closure timing EVC may be phase-advanced in such a manner as to shut up or confine a large amount of burned gas in the cylinder. Usually, cooperative control for EGR control (the EGR amount) and EVC control (exhaust valve closure timing) is made to more precisely control or adjust the amount of residual gas depending on engine-and-vehicle operating conditions. The quantity of air entering the cylinder varies depending on the residual gas amount. For the reasons discussed above, in order to optimize combustion, all of fuel injection quantity control, injection timing control, and VVC control (exactly, VTC phase-change control of the VVC system) have to be executed simultaneously.

Figure 10:
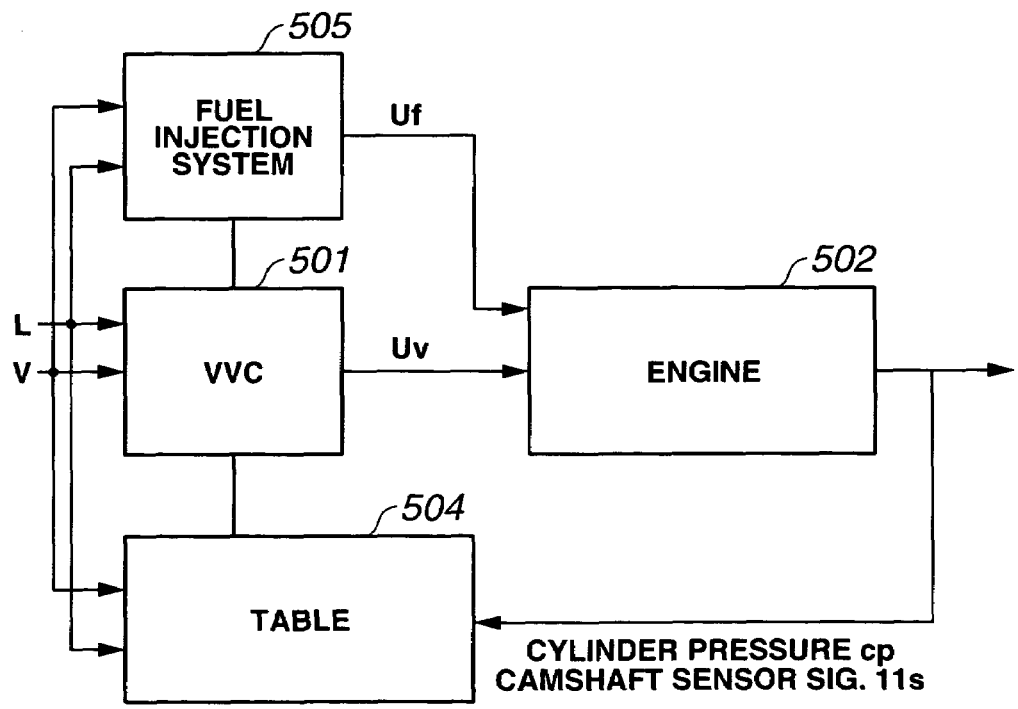
FIG. 10 is a block diagram illustrating the control apparatus of another embodiment, whose control system has a preprogrammed look-up table (a dynamic compensator) computing an estimated VVC-system manipulated variable Uv' and an estimated fuel-injection-system manipulated variable Uf', fully taking into account a state of combustion, and in which cooperative control between the VVC system and the fuel injection system is made.

Referring now to FIG. 10, there is shown the block diagram for integrated engine control executed within ECU 6 incorporated in the control apparatus of another embodiment to improve both the engine power output and the combustion process. As appreciated from the block diagram of FIG. 10, as manipulated variables of engine 502, there are (i) a manipulated variable Uv of VVC system 501, concretely, exhaust valve open timing EVO, exhaust valve closure timing EVC, intake valve open timing IVO, intake valve closure timing IVC, the exhaust valve lift characteristic, and the intake valve lift characteristic, and (ii) a manipulated variable Uf of fuel injection system 505, concretely, the fuel injection amount and injection timing of each of injection valves. As previously discussed, basically the manipulated variables Uf and Uv are determined based on vehicle speed V and engine load L (i.e., accelerator-pedal depression amount APS). In order to avoid a delay in a control system's responsiveness and for dynamic compensation, these manipulated variables Uf and Uv are modified or compensated for on the basis of the comparison result (i.e., the deviation) of CA50 and CA50R by means of a table block 504, serving as a dynamic compensator or a model of combustion in the engine or a combustion characteristic model. In the control system of FIG. 10, table block 504 computes an estimated VVC-system manipulated variable Uv' and an estimated fuel-injection-system manipulated variable Uf', fully taking into account a state of combustion, concretely, the deviation of CA50 and CA50R.

Figure 11:
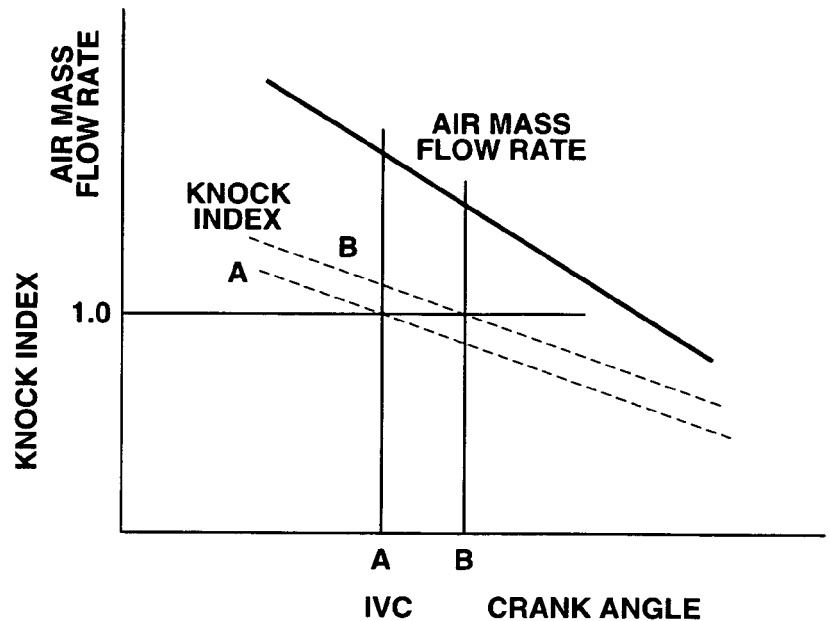
FIG. 11 is a characteristic diagram illustrating the relationship among a crank angle corresponding to intake valve closure timing IVC, a knock index, and an air mass flow rate.

Referring to FIG. 11, there is shown the characteristic diagram illustrating the relationship among a crank angle corresponding to intake valve closure timing IVC, a knock index, and an air mass flow rate. The knock index can be calculated from cylinder pressure cp, which pressure is one of combustion characteristic values that control or manage the state of combustion. As can be seen from the knock index characteristic indicated by the broken line in FIG. 11, the knock index, in other words, effective compression ratio $\epsilon'$, tends to increase, as intake valve closure timing IVC phase-advances. The knock index varies depending on a fuel property, such as a fuel's cetane number and a fuel's octane number. As appreciated from the "A" characteristic indicated by the broken line in FIG. 11, in the case of a high fuel's octane number, the knock index becomes low. In contrast, as appreciated from the "B" characteristic indicated by the broken line in FIG. 11, in the case of a high fuel's cetane number, the knock index becomes high. It is difficult to unify a fuel property of an individual engine at a commercial service station. Suppose that fuel having the "B" characteristic (high cetane number) is put in an engine, whose IVC is set to be suitable to fuel having the "A" characteristic (high octane number) of FIG. 11. In such a case, the knock index becomes high. Conversely suppose that fuel having the "A" characteristic (high octane number) is put in an engine, whose IVC is set to be suitable to fuel having the "B" characteristic (high cetane number). In such a case, the knock index becomes low. A thermal efficiency deteriorates even if the knock index is too lower (or too higher) than "1".

In the control apparatus of the embodiment, the knock index is grasped or estimated by cylinder pressure cp, and thus it is possible to properly set intake valve closure timing IVC by means of an onboard computer, utilizing preprogrammed characteristic curves containing at least the high-octane-number characteristic curve "A" and the high-cetane-number characteristic curve "B", so that the estimated knock index is adjusted or brought closer to "1". Therefore, it is possible to avoid the thermal efficiency and engine performance from deteriorating owing to a change in fuel property. As discussed previously, the ignition lag, which controls or manages the state of combustion, changes depending on the temperature and pressure of air-fuel mixture, and various states/characteristics of air-fuel mixture. According to the control apparatus of the embodiment, it is possible to correct a deviation of the ignition lag from an optimal value, which deviation may arise from a change in mixture temperature, a change in mixture pressure, and changes of various states of air/fuel mixture (e.g., a change in turbulence intensity, and a change in fuel property), in real time.

As can be seen from the characteristic indicated by the solid line in FIG. 11, illustrating the relationship between a crank angle corresponding to IVC and an air mass flow rate, when intake valve closure timing IVC is phase-retarded, air that has been introduced into the cylinder once, tends to flow back to induction system 20. As a result of this, the mass of air in the cylinder also reduces. Under this condition (with the IVC retarded), the fuel injection quantity has to be properly controlled depending on a change in the air mass flow rate in the cylinder, arising from the back flow of air-fuel mixture from the cylinder to induction system 20. Suppose that the fuel injection quantity is controlled regardless of such an air mass flow rate change. Undesirably, this may result in a deviation of the fuel/air ratio (F/A mixture ratio) from a desired value, thereby deteriorating the emission control performance. To avoid this, in the control apparatus of the embodiment, simultaneously with execution of IVC control for the VVC system, the fuel injection quantity for the electronic fuel injection system is compensated for, so as to reconcile both the engine power performance and the exhaust emission control performance.

Figure 12:
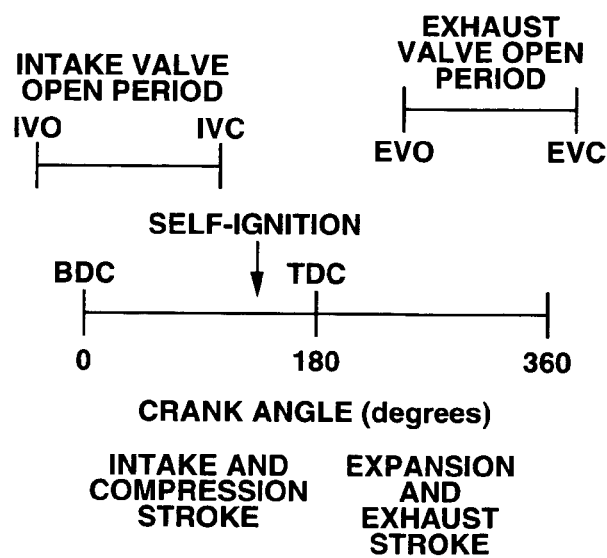
FIG. 12 is a diagram of intake valve open timing (IVO), intake valve closure timing (IVC), exhaust valve open timing (EVO), and exhaust valve closure timing (EVC) in a two-stroke-cycle internal combustion engine to which the control apparatus of the embodiment is applicable.

Referring now to FIG. 12, there are shown the timings IVO and IVC of intake valve 9 and the timings EVO and EVC of exhaust valve 10 during normal engine operation in a two-stroke-cycle compression ignition engine, such as a two-stroke-cycle Diesel engine. One operating cycle of events, namely the intake and compression strokes as well as the power and exhaust strokes, is completed for every crankshaft revolution (360 degrees of crank angle). During the first 180 degrees crank angle range (in a crank angle range from 0° to 180°), the intake and compression strokes are produced. During the subsequent 180 degrees crank angle range (in a crank angle range from 180° to 360°), the power and exhaust strokes are produced. Self-ignition of the sprayed fuel occurs before TDC, corresponding to 180 degrees of crank angle. The valve-opening action of intake valve 9 and the valve-opening action of exhaust valve 10 are performed once for each crankshaft revolution. Thus, in the two-stroke-cycle engine, in FIG. 1 camshaft timing pulley 14 is driven by the crankshaft at the same revolution speed of crankshaft 2. The other structure of the two-stroke-cycle compression ignition engine is similar to that of the four-stroke-cycle compression ignition engine. In the two-stroke-cycle compression ignition engine, when intake valve closure timing IVC is brought closer to BDC, gas (air) charged in the cylinder is compressed under a condition where the mass of the charged gas is great, thus increasing or rising the effective compression ratio. On the contrary, when intake valve closure timing IVC is phase-retarded with respect to BDC, for the same internal pressure in induction system 20, there is a tendency for the quantity of gas (air) charged into the cylinder to be reduced, thus lowering or decreasing the effective compression ratio. Hereupon, it is necessary to care the fact that the quantity of air charged into the cylinder of engine 1 changes depending on intake valve closure timing IVC. When intake valve closure timing IVC is retarded, the quantity of air charged into engine 1 becomes small. Therefore, it is necessary to properly control the fuel injection quantity, fully taking into account intake valve closure timing IVC. For this reason, the fuel injection quantity is compensated for responsively to at least sensor signals from camshaft sensor 16 and airflow sensor 17 in addition to vehicle speed V (engine speed Ne) and engine load L (e.g., the amount APS of depression of the accelerator pedal), thereby preventing or suppressing the generation of soot.

Actually, the mass of fuel, injected from fuel injection valve 4, is controlled or changed depending on various factors, that is, the quantity Qa of air entering the engine cylinder, measured by airflow sensor 17, the accelerator-pedal depression amount APS, and engine speed Ne detected by crank angle sensor 5. In addition to the aforementioned sensor signals, preferably, the state of EGR valve 19 (i.e., the EGR valve opening) and the turbo-charging state (e.g., boost pressure) of turbo charger 18 may be taken into account for determining the mass of the injected fuel and injection timing. As a matter of course, in the case of the occurrence of a change in VTC phase, that is, a change in intake valve open timing IVO as well as a change in intake valve closure timing IVC, it is necessary to properly change the injection timing as well as fuel-injection quantity. For the reasons discussed above, the sensor signal input from camshaft sensor 16 into the input interface of ECU 6 is important to execute the VTC phase control (that is, IVC phase control) and also to execute the electronic fuel injection control. For instance, in the case of one-stroke injection of the Diesel engine, a fuel injection pattern is classified into a pilot-injection area, a before-injection area, a main-injection area, an after-injection area, and a post-injection area. The fuel injection pattern changes depending on engine-and-vehicle operating conditions. In fuel injection system 505 of the block diagram shown in FIG. 10, the fuel injection pattern, corresponding to the manipulated variable Uf of the fuel injection system, is given as a function of intake valve closure timing IVC. By the use of the predetermined or preprogrammed function representative of the relationship between the fuel injection pattern and intake valve closure timing IVC, a change in intake valve closure timing IVC can be remarkably reflected as a change in the fuel injection pattern (containing a fuel injection quantity and the number of fuel injections).

Figure 13:
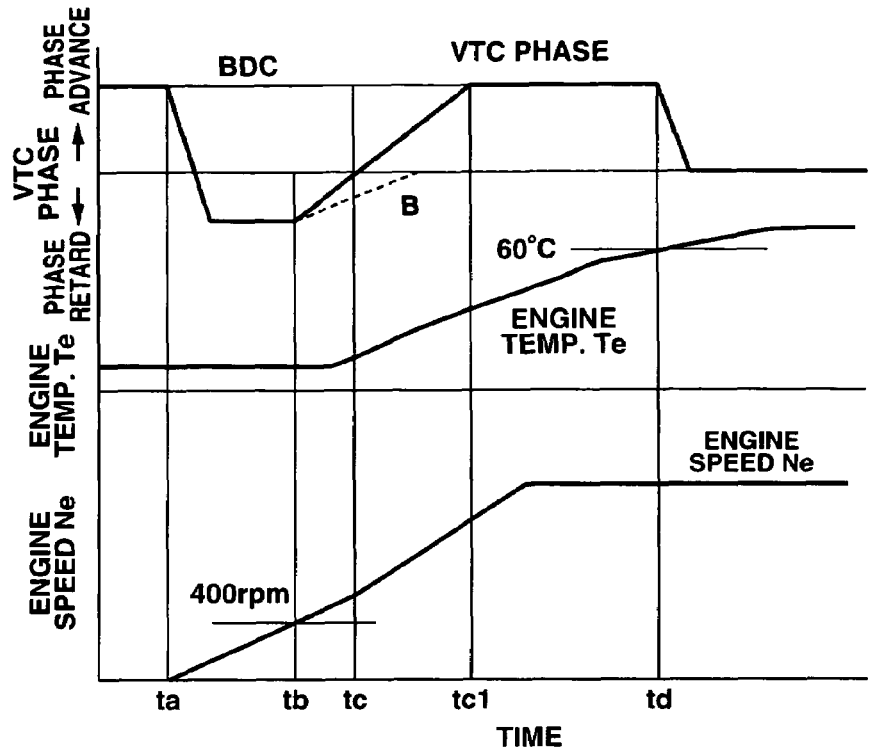
FIG. 13 shows another phase-control characteristic of the VVC system incorporated in the control apparatus of the embodiment, for a water temperature change and an engine speed change.

On automotive vehicles, owing to a rapid engine torque rise, the vehicle body tends to vibrate undesirably owing to torsional vibrations occurring at driveshafts. Such a vibrating state would likely to cause the vehicle occupants to feel considerable discomfort. To avoid this, as can be seen from the phase-control characteristic of FIG. 13, the VTC phase is first controlled to a phase-retard state (considerably retarded from BDC) simultaneously with the start of cranking (see a rapid fall in the VTC phase from the time ta), and thereafter the VTC phase is gradually controlled moderately toward a phase corresponding to a phase-advance state (=BDC) from the time tb at which the cranking speed begins to exceed 400 rpm. Thereafter, at the time tc when the VTC phase is advanced up to a predetermined phase, fuel injection starts. The phase-advancing operation of the VTC phase (intake valve open timing IVO as well as intake valve closure timing IVC) is continued until the time tc1, while observing the actual combustion characteristic values (e.g., CA50), thus resulting in a gradual increase in the quantity of air charged into the cylinder. As a consequence, as can be appreciated from a moderate engine speed rise from the time tc in FIG. 13, it is possible to realize a gradual rise in engine power output or engine torque. As a matter of course, simultaneously with a change in the VTC phase (timing changes for IVO and IVC), the fuel injection quantity and injection timing are both controlled properly by means of ECU 6. At the time td that engine temperature Te exceeds the predetermined temperature value, for example 60° C., and engine warm-up has been completed and combustion has been stabilized, the processor of ECU 6 inhibits the VTC phase from being held at the phase-advance state, substantially corresponding to BDC, and sets the VTC phase to a desired phase determined by the observed combustion characteristic values (e.g., CA50), thus ensuring a drop in effective compression ratio $\epsilon'$, in other words, improved fuel economy.

The output torque value of engine 1 is almost determined based on the fuel injection quantity. As a matter of course, for engine torque control in a transient engine operating state, the air mass flow rate as well as the fuel injection quantity must be varied. Therefore, in order to improve the combustion performance and engine power performance and exhaust emission control performance in the transient operating state, in the control apparatus of the embodiment, as appreciated from the block diagram of FIG. 10, cooperative control for VVC system 501 and fuel injection system 505 is executed.

On hybrid vehicles employing an automatic engine stop-restart system capable of temporarily automatically stopping an internal combustion engine under a specified condition where a selector lever of an automatic transmission is kept in its neutral position, the vehicle speed is zero, the engine speed is an idle speed, and the brake pedal is depressed, and automatically restarting the engine from the vehicle standstill state, the engine stop and restart operation is frequently executed even after completion of engine warm-up. In the case of engine restart operation, engine 1 has already been warmed up and thus engine 1 is in the stable combustion state without executing phase-advance control for the IVC phase. Therefore, it is possible to omit the phase-advancing process of the VTC phase to a phase corresponding to a phase-advance state (=BDC) from the time tb in FIG. 13. As can be seen from the B characteristic curve indicated by the broken line in FIG. 13, with the lapse of time, the VTC phase is gradually shifted or controlled from the phase-retard state (considerably retarded from BDC and corresponding to the low effective compression ratio) to the phase suited to the normal engine operation of engine 1 without the phase-advancing process to the phase-advance state (=BDC), while observing the actual combustion characteristic values. As a result of this, it is possible to prevent uncomfortable noise and vibrations of the vehicle, occurring owing to a rapid engine-torque rise at the beginning of fuel injection during engine startup under the in-cylinder pressure substantially identical to atmospheric pressure. Additionally, by omitting or eliminating the phase-advancing process to the phase-advance state (=BDC), it is possible to effectively reduce an electric power consumption rate of the engine starter or the motor generator.

Figure 14:
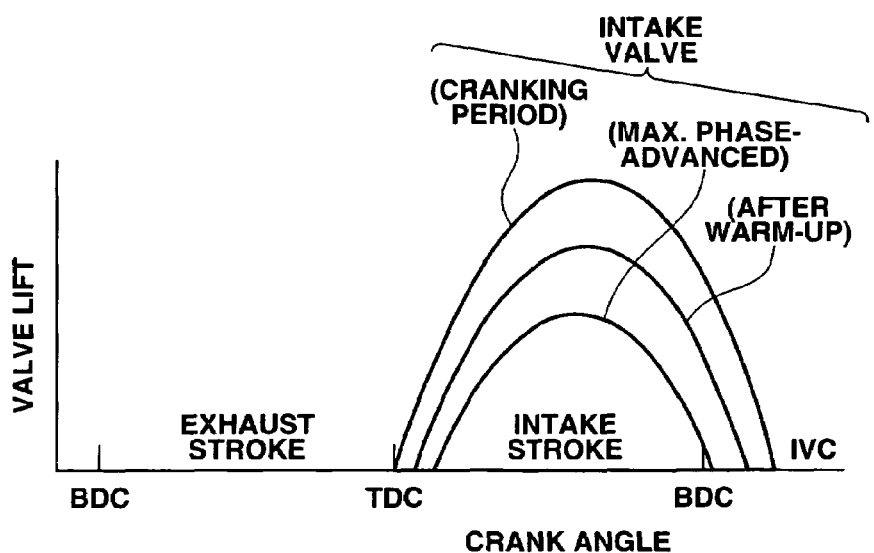
FIG. 14 is a valve event and lift control characteristic diagram showing valve event and lift characteristics attained by a continuously variable valve event and lift control (VEL) system, for effective compression ratio changes under various operating conditions, such as during cranking, after engine warm-up, and at maximum phase-advance timing.

Effective compression ratio $\epsilon'$ of engine 1 can be controlled by means of either one of a variable valve timing control (VTC) mechanism, a variable valve lift (VVL) mechanism, and a continuously variable valve event and lift (VEL) control mechanism. FIG. 14 shows the intake valve lift and event characteristic, which is obtained by the continuously variable valve event and lift (VEL) control mechanism, capable of continuously varying both of valve lift and event from a short event (small working angle) and low valve lift characteristic to a long event (large working angle) and high valve lift characteristic. As can be seen from the characteristic curves of FIG. 14 attained by the intake-valve VEL system, during a cranking period, the intake valve lift is set to the maximum lift state and thus intake valve closure timing IVC is phase-retarded to reduce the work of compression. As soon as the cranking speed exceeds the predetermined speed value such as 400 rpm, the intake valve lift is set to the minimum lift state and thus intake valve closure timing IVC is phase-advanced to its maximum phase-advance timing to increase certainty in stable combustion. Thereafter, at a point of time at which engine warm-up has been completed and combustion has been stabilized, the intake valve lift is set to an intermediate lift value between the maximum lift value and the minimum lift value, while observing the actual combustion characteristic values, so as to properly timely retard intake valve closure timing IVC from BDC, and whereby a mechanical friction loss is reduced and fuel economy is improved.

Figure 15:
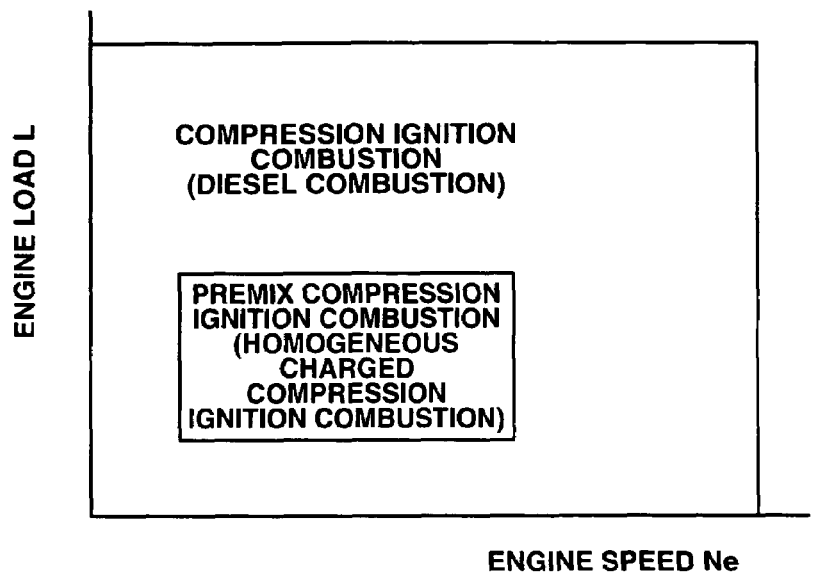
FIG. 15 is a diagram showing the relationship of engine speed, engine load, a premixed compression ignition combustion area, and a diesel combustion area.

Referring now to FIG. 15, there is shown the relationship of a premix compression ignition combustion area (a homogeneous charged compression ignition (HCCI) combustion area) and a compression ignition combustion area (i.e., a diesel combustion area) for engine speed Ne and engine load L. As can be seen from the small rectangle area of FIG. 15, the premix compression ignition combustion (HCCI combustion) is realized in an operating range wherein engine speed Ne and engine load L are both low. When engine speed Ne is high and engine load L is high, the concentration of fuel in the cylinder tends to become excessively rapid combustion occurs, thereby resulting in undesirable knocking. For this reason, during high speed and high load operation, the combustion mode is switched from the premix compression ignition combustion mode to the compression ignition combustion mode (i.e., the diesel combustion mode). Such a diesel combustion mode ensures stable combustion even in an operating state of low air-fuel mixture temperatures. In contrast, in the case of premix compression ignition combustion (HCCI combustion), the concentration of fuel in the cylinder is low (lean), and thus there is a tendency for an engine misfire to occur under a condition where the air-fuel mixture temperature is low. For the purpose of a rise in air-fuel mixture temperature, it is very advantageous and effective to increase effective compression ratio $\epsilon'$. Thus, in the premix compression ignition combustion area (i.e., in the HCCI combustion area) as well as during the engine starting period, it is preferable that the VTC phase of the VVC system is controlled to a phase-advance state, while observing the actual combustion characteristic values.

In gasoline engines, premix compression ignition combustion is realized in an operating range wherein engine speed Ne and engine load L are both low. As discussed previously, when engine speed Ne is high and engine load L is high, the concentration of fuel in the cylinder tends to become high and thus undesirable engine knock tends to occur owing to excessively rapid combustion. To avoid knocking, the combustion mode is switched from the premix compression ignition combustion mode to the normal spark-ignition gasoline combustion mode (simply, the gasoline combustion mode). Due to switching to the spark-ignition combustion mode, manipulated variable Uv of the VVC system also varies. Hitherto, VTC phase control was performed without fully taking into account the actual combustion characteristic values, and therefore a drop in engine power output occurred (see an engine torque fall indicated by the solid line in FIG. 6) owing to mode-switching to the spark-ignition combustion mode. In contrast, in the case of the dynamic-compensator equipped control apparatus of the embodiments (see engine model 504M of FIG. 4 and lookup table 504 of FIG. 10), VVC-system manipulated variable Uv is predictably corrected based on the deviation of the actual combustion characteristic value (e.g., CA50) and the desired combustion characteristic value (e.g., CA50R), and additionally VVC-system manipulated variable Uv and fuel-injection-system manipulated variable Uf are simultaneously controlled by way of cooperative control for the VVC system and the fuel injection system. Thus, it is possible to prevent a deterioration in the engine performance during the mode-switching period.

On compression ignition engines of compression ignition or on premix compression ignition engines of premix compression self-ignition), glow plug 8 (a small electric heater) shown in FIG. 1 is located inside the engine cylinder or an electric heater is often provided in the induction system, for preheating the air or promotion of vaporization of the fuel, in combination with VTC phase control of the VVC system, thereby assisting spontaneous ignition and promoting combustion during an engine starting period, and consequently enhancing the engine startability and premixed compression ignition (homogeneous changed compression ignition). Electric power consumed by the electric heater or glow plug 8 is great (e.g., several amperes). When supplying electric power to the electric heater or glow plug 8 during cranking, there is an increased tendency for the cranking speed to be fallen, thereby deteriorating the engine startability. As a countermeasure for a fall in cranking speed, occurring owing to electric power consumed by the electric heater or glow plug 8, the glow-plug/electric-heater control routine shown in FIG. 16 is executed.

Figure 16:
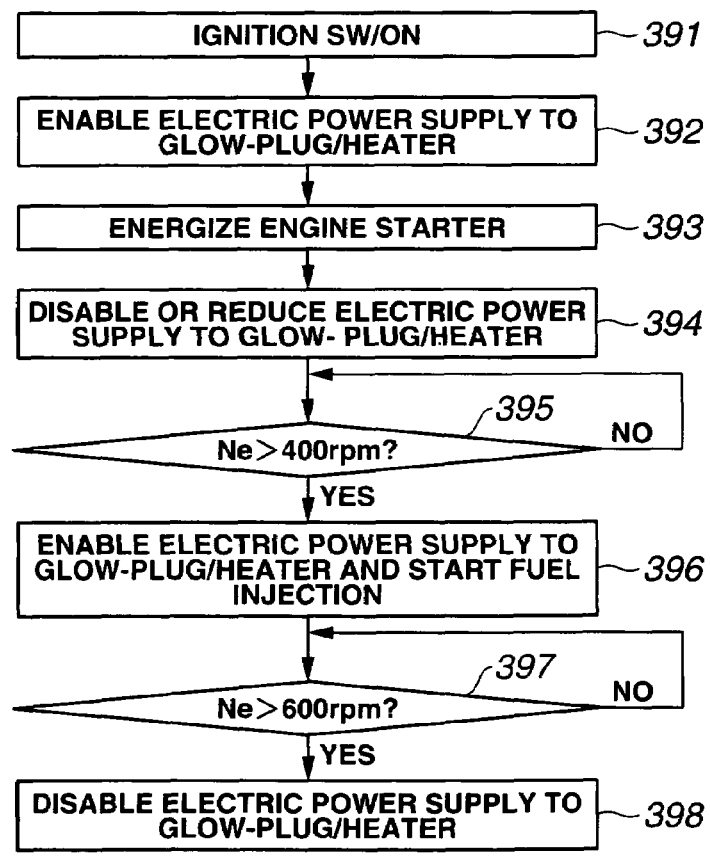
FIG. 16 is a flow chart showing a glow-plug/electric-heater control routine.

Referring to FIG. 16, at step 391, an ignition switch (an engine key switch) is turned ON. At step 392, electric power supply to glow plug 8 (electric heater) is enabled, and thus electric power is supplied to glow plug 8 (electric heater) to energize it. Subsequently to step 392, step 393 occurs. At step 393, starter 7 becomes energized (ON). At the same time, at step 394, electric power supply to glow plug 8 (electric heater) is shut off (disabled) or reduced to a low level. At step 395 after step 394, a check is made to determine whether the latest up-to-date informational data of engine speed Ne, determined based on the sensor signal from crank angle sensor 5, exceeds a first predetermined speed value such as 400 rpm. When the answer to step 395 is affirmative (YES), that is, when the current engine speed exceeds the first predetermined speed value (e.g., 400 rpm), the routine proceeds from step 395 to step 396. Conversely when the answer to step 395 is negative (NO), step 395 is repeatedly executed, until the current engine speed exceeds the first predetermined speed value owing to a rise in cranking speed. Under the condition of cranking speed above 400 rpm, through step 396 electric power is supplied again to glow plug 8 (electric heater) to energize it in combination with the VTC phase control of the VVC system, and simultaneously fuel injection starts. At this time (at step 396), phase-advance control for variable valve actuation mechanism 13 (the VTC mechanism) is executed (see the VTC phase change from the time tb in FIG. 8). Thereafter, at step 397, a check is made to determine whether the latest up-to-date informational data of engine speed Ne exceeds a second predetermined speed value such as 600 revolutions per minute. When the answer to step 397 is affirmative (YES), that is, when the current engine speed exceeds the second predetermined speed value (e.g., 600 rpm), the routine proceeds from step 397 to step 398. Conversely when the answer to step 397 is negative (NO), step 397 is repeatedly executed, until the current engine speed exceeds the second predetermined speed value (e.g., 600 rpm). Immediately when the current engine speed exceeds the second predetermined speed value (e.g., 600 rpm), electric power supply to glow plug 8 (electric heater) is shut off (disabled) through step 398.

By way of execution of the glow-plug/electric-heater control routine shown in FIG. 16, electric power supply to glow plug 8 (electric heater) can be temporarily shut off (disabled) or reduced to a low level, until the cranking speed reaches the first predetermined speed value such as 400 rpm. This increases certainty in sufficient electric power supply to starter 7, thus more certainly enhancing the engine startability and premixed compression self-ignitability.

It is well-known to increase the engine power output by increasing the air mass flow rate by way of boost pressure (super-charging action) and by simultaneously increasing the fuel injection quantity.

Figure 17:
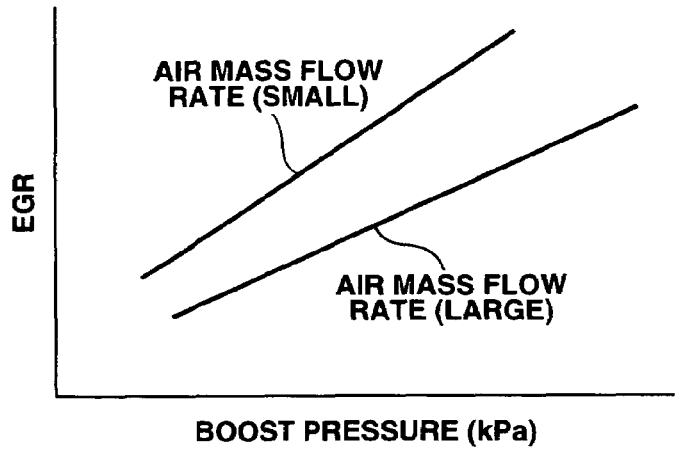
FIG. 17 is a characteristic diagram illustrating the relationship among a boost pressure, an amount of external EGR (exhaust gas recirculated), and an air mass flow rate.

As seen in FIG. 17, assuming that, for the same EGR rate, a boost pressure is increased, an air mass flow rate tends to increase. Due to the increased air mass flow rate, the fuel injection quantity is also increasingly compensated for. This results in an increase in engine power output. On the contrary, assuming that, for the same boost pressure, an EGR rate is increased, an air mass flow rate tends to decrease. As a matter of course, due to the decreased air mass flow rate, the fuel injection quantity has to be decreasingly compensated for. This results in a decrease in engine power output. For the purpose of reduced NOx emissions, it is necessary to provide or ensure the EGR rate of approximately 20%.

Figure 18:
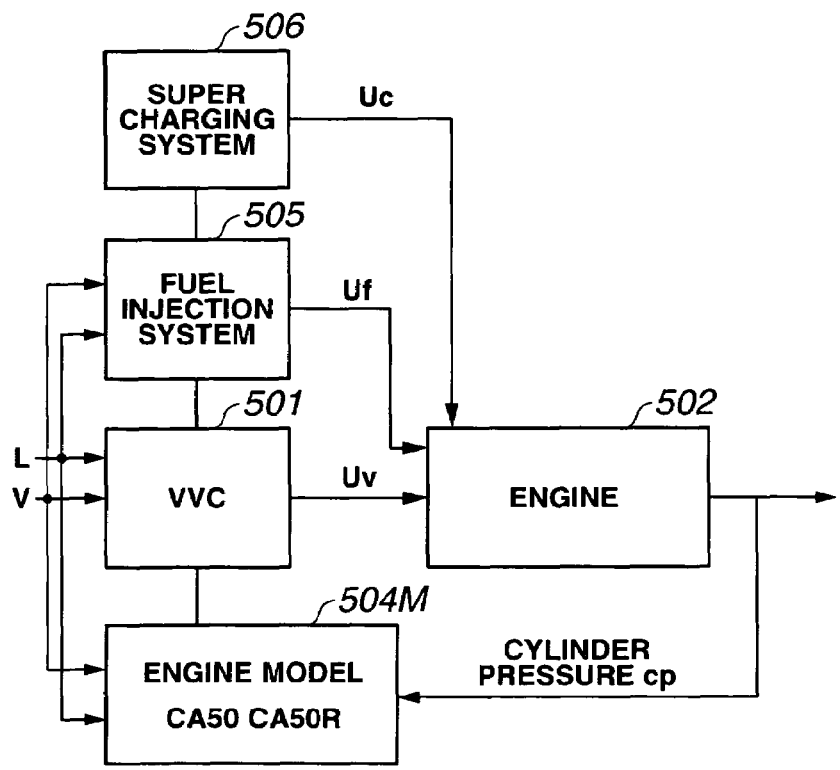
FIG. 18 is a modified block diagram illustrating the control apparatus, whose control system has an engine model (a dynamic compensator) computing an estimated VVC-system manipulated variable Uv' and an estimated fuel-injection-system manipulated variable Uf', fully taking into account a state of combustion, and in which cooperative control among the super-charging system, the VVC system, and the fuel injection system is made.

Referring now to FIG. 18, there is shown a modified block diagram for integrated engine control executed within ECU 6 of the control apparatus to improve both the engine power output and the combustion process. The modified block diagram of FIG. 18 is similar to that of FIG. 10, except that in the block diagram of FIG. 18 a control block of super-charging system 506 is further added and additionally the table block 504 of FIG. 10 is replaced with an engine-model block 504M. Thus, the same block numbers used to designate blocks in the diagram shown in FIG. 10 will be applied to the corresponding block numbers used in the modified block diagram shown in FIG. 18, for the purpose of comparison of the two different block diagrams of FIGS. 10 and 18. Blocks 506 and 504M will be hereinafter described in detail with reference to the accompanying drawings, while detailed description of blocks 501, 502, and 505 will be omitted because the above description thereon seems to be self-explanatory.

The control block of super-charging system 506 (including turbo charger 18 and the EGR system having EGR valve 19) is connected through the control block of fuel injection system 505 and the control block of VVC system 501 to the engine-model block 504M for cooperative control (relevant-control) among super-charging system 506, fuel injection system 505, and VVC system 501. As a result of the cooperative control among these systems, a manipulated variable Uc of super-charging system 506, that is, (i) a manipulated variable of turbo charger 18, concretely, a rotational speed of turbo charger 18, a waste gate valve opening of turbo charger 18, a nozzle opening of a variable-nozzle turbine of turbo charger 18, and the like), and (ii) a manipulated variable of the EGR system, concretely, a valve opening of EGR valve 19, is suitably determined. Therefore, the interrelation between the amount of exhaust gas recirculated (EGR) and the boost pressure can be optimally kept by adjusting the amount of residual gas by way of VVC system control, even when a change in the temperature of EGR occurs. Therefore, it is possible to reconcile both of the reduced exhaust emissions and the increased engine power output.

Figure 19:
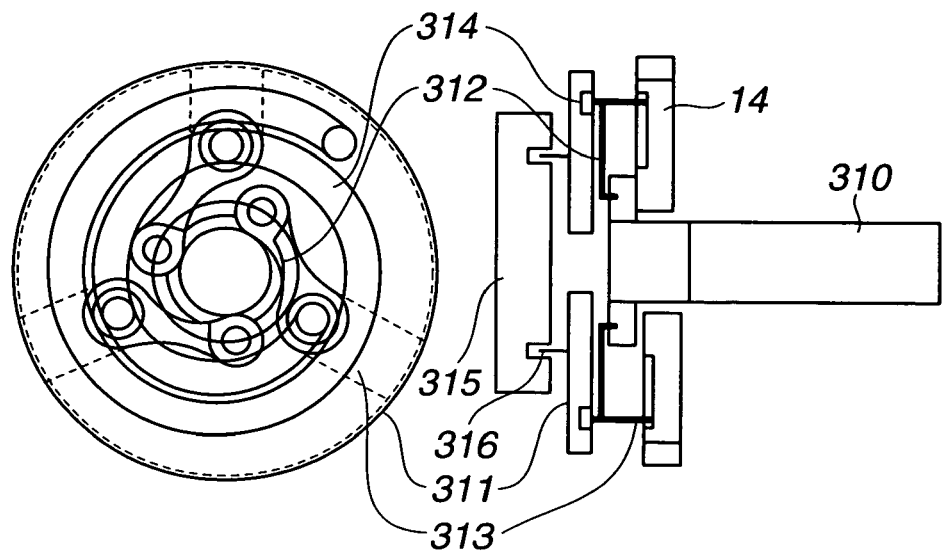
FIG. 19 is a construction drawing illustrating an electric-motor driven spiral disk type variable valve timing control (VTC) mechanism, which is applicable to the VVC system included in the control apparatus of the embodiment.

As a variable valve actuation means capable of variably adjusting the manipulated variable Uv of VVC system 501 shown in the block diagrams shown in FIGS. 3, 4, 10, and 18, and thus enabling a relative phase change of a camshaft to camshaft timing pulley 14 (i.e., a valve-timing change of the engine valve), a motor-driven spiral disk type VTC mechanism as shown in FIG. 19, may be used. Actually, in the case of the motor-driven spiral disk type VTC mechanism of FIG. 19, the phase difference between a camshaft 310 and camshaft timing pulley 14 can be varied by means of a linkage (a motion converter) 312. The radial outside portion of linkage 312 is mechanically linked to both of camshaft timing pulley 14 and a spiral disk 311, such that the radial outside portion of linkage 312 slides along a guide groove 313 formed in camshaft timing pulley 14 and also slides along a guide groove 314 formed in spiral disk 311. On the other hand, the radial inside portion of linkage 312 is fixedly connected to camshaft 310. When the phase angle of spiral disk 311 relative to camshaft timing pulley 14 varies, the radial position of the outside portion of linkage 312 with respect to the axis of camshaft 310 varies, and thus a phase change of camshaft 310 relative to camshaft timing pulley 14 (i.e., a phase-angle change of camshaft 310 to an engine crankshaft) occurs. There are various methods to vary the phase angle of spiral disk 311 relative to camshaft 310. In the case of the motor-driven spiral disk type VTC mechanism shown in FIG. 19, a hysteresis motor 315 is used as an actuator (a driving power source or an electrically-controlled actuator means). Hysteresis motor 315 can apply torque to a hysteresis member 316 in a spaced, contact-free relationship with hysteresis member 316, for varying the phase angle of spiral disk 311 relative to camshaft timing pulley 14. Assuming that the car battery voltage is higher than a specified voltage value, the motor-driven VTC mechanism can be certainly operated by means of hysteresis motor 315 from the time when engine 1 is cranked. As is generally known, the magnitude of torque acting on hysteresis member 316 increases, as the applied electric current to hysteresis motor 315 increases. The increased torque acts to rotate hysteresis member 316 against the spring force of a biasing means such as a return spring (not shown). As a result, it is possible to continuously vary the relative phase of camshaft 310 to camshaft timing pulley 14 responsively to the current value of the applied current to hysteresis motor 315. Therefore, it is possible to accurately control or adjust the actual relative phase of camshaft 310 to camshaft timing pulley 14 to a desired value by controlling the applied current by way of closed-loop control (feedback control) in response to the sensor signal from camshaft sensor 16.

Figure 20:
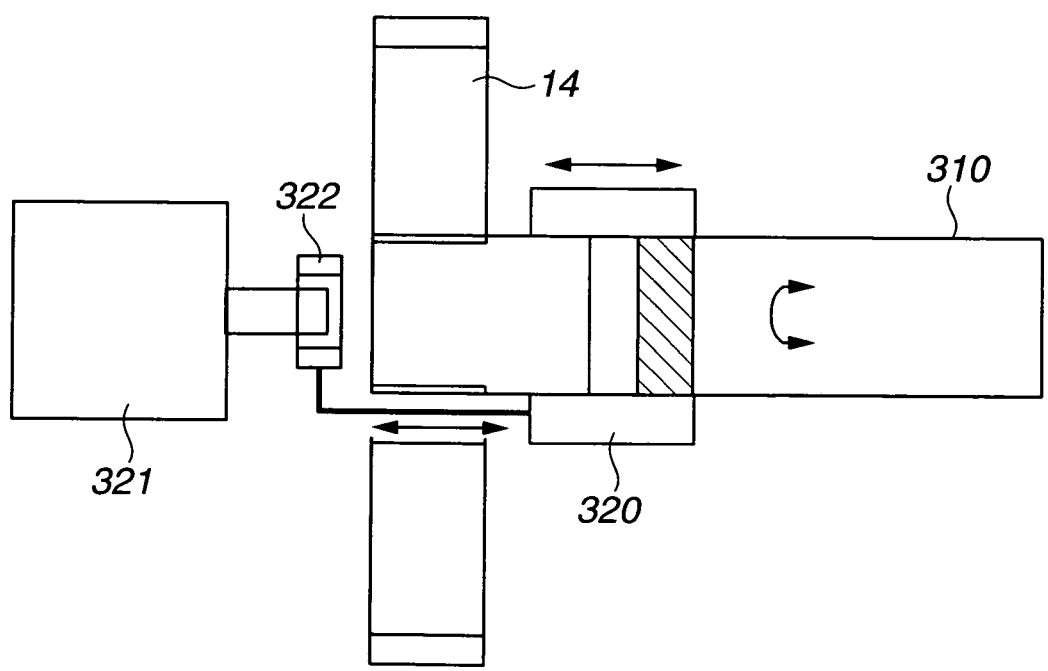
FIG. 20 is a schematic drawing showing the construction of another type of VTC mechanism, that is, an electric-motor actuated helical-spline type VTC mechanism, which is applicable to the VVC system included in the control apparatus of the embodiment.

Referring now to FIG. 20, there is shown a modification of the motor-driven VTC mechanism, which is applicable to the control apparatus of the embodiment. In the modified VTC mechanism of FIG. 20, relative phase of camshaft 310 to camshaft timing pulley 14, in other words, relative phase of camshaft 310 to crankshaft 2 is varied by means of a helical spline mechanism 320. Helical spline mechanism 320 is comprised of a substantially ring-shaped axially-movable helical-gear nut having an internal helically-splined groove portion, and an external helically-splined shaft end portion of camshaft 310. The internal helically-splined groove portion of the nut is in meshed-engagement with the external helically-splined shaft end portion of camshaft 310. Axially leftward movement or axially rightward movement of the nut of helical spline mechanism 320 causes a change in relative phase of camshaft 310 to camshaft timing pulley 14. As an actuator (a driving power source or an electrically-controlled actuator means) that creates axial movement of the nut of helical spline mechanism 320, a reversible motor 321 is used. As clearly shown in FIG. 20, a rotary-to-linear motion converter 322 is interleaved or provided between the motor shaft of motor 321 and the nut of helical spline mechanism 320, for converting rotary motion of the motor shaft in a normal-rotational direction or in a reverse-rotational direction into axial movement of the nut of helical spline mechanism 320. In the shown embodiment, motor 321 is installed on the cylinder head of engine 1. In lieu thereof, motor 321 may be installed on camshaft timing pulley 14. In the case of motor 321 installed on the cylinder head of engine 1, a bearing has to be attached to the rotary-to-linear motion converter 322. In this case, rotary motion of the motor shaft of motor 321 is converted into axial movement (linear motion) of the nut of helical spline mechanism 320 through the bearing. With the previously-noted arrangement of FIG. 20, the variable valve timing control function of the VTC system can be achieved or realized simultaneously with the start of cranking, by electrically controlling motor 321. In more detail, the actual relative phase of camshaft 310 to camshaft timing pulley 14 can be controlled or adjusted to a desired value by controlling rotary motion (or an applied current value) of motor 321 by way of closed-loop control responsively to the sensor signal from camshaft sensor 16. As a reversible motor that creates axial movement of the nut of helical spline mechanism 320, the VTC system may use a D. C. motor, a stepping motor, a synchronous motor with a permanent magnet, or the like. In the case of the use of rotary-to-linear motion converter 322 having a design speed reduction ratio set to a comparatively great value, it is more desirable or preferable that the VTC mechanism is conditioned in its maximum phase-retard state, in advance, before the start of cranking, so that the VTC mechanism can be kept at the maximum phase-retard state, even under a condition where a drop in battery voltage occurs during the cranking period.

As will be appreciated from the above, according to the control apparatus of the embodiment, in a VVC-system equipped internal combustion engine, it is possible to effectively compensate for a deviation of a combustion characteristic value related to combustion of the engine from an optimal value, which deviation arises from changes/fluctuations in states/characteristics of air-fuel mixture, such as a change in fuel property, thus reconciling enhanced engine performance and reduced exhaust emissions (reduced soot and reduced NOx emissions).

According to a dynamic-compensator equipped control system of the control apparatus, it is possible minimize a deviation of a transient-engine-operating-state combustion characteristic value from its desired value, thus balancing two contradictory requirements, that is, enhanced transient-operating-state engine performance and reduced exhaust emissions.

According to an integrated engine control system for an internal combustion engine employing a VVC system and an electronic fuel injection system, even when combustion characteristic values change due to a change in intake valve timing and lift characteristic, a manipulated variable Uf (fuel injection quantity and injection timing) of the fuel injection system can be modified in real time, thus avoiding instable combustion and formation of soot in advance, and consequently reconcile improved engine performance and reduced exhaust emissions.

Furthermore, according to the control apparatus of the embodiment, it is possible to minimize a deviation of a combustion characteristic value from a desired value, occurring when switching to premixed compression self-ignition combustion (homogeneous charged compression ignition (HCCI) combustion), and whereby a deviation of the combustion characteristic value from an optimal value, arising from changes/fluctuations in states/characteristics of air-fuel mixture, such as a change in fuel property, can be reliably quickly compensated for, and therefore both of enhanced transient-operating-state engine performance and reduced exhaust emissions can be realized.

Moreover, in an internal combustion engine employing all of a VVC system, an EGR system and a super-charging system, it is possible to minimize a deviation of a combustion characteristic value from a desired value, while executing cooperative control of the VVC system and at least one of the EGR system and the super-charging system, and whereby a deviation of the combustion characteristic value from an optimal value, arising from changes/fluctuations in states/characteristics of air-fuel mixture, such as a change in fuel property, can be reliably quickly compensated for, and therefore both of enhanced transient-operating-state engine performance and reduced exhaust emissions can be realized.

The entire contents of Japanese Patent Application No. 2005-305770 (filed Oct. 20, 2005) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A control apparatus for controlling an internal combustion engine, comprising:
   a sensor that detects at least one combustion characteristic value related to combustion of the engine; and
   a control system that determines a desired combustion characteristic value based on engine-and-vehicle operating conditions, and controls a manipulated variable of a variable valve actuation system in a manner so as to bring the detected combustion characteristic value closer to the desired combustion characteristic value; and
   a dynamic compensator provided to estimate the manipulated variable of the variable valve actuation system based on the detected combustion characteristic value,
   wherein the control system controls the manipulated variable of the variable valve actuation system, using the estimated manipulated variable obtained by the dynamic compensator, in a manner so as to bring the detected combustion characteristic value closer to the desired combustion characteristic value.

2. A control apparatus for controlling an internal combustion engine, comprising:

a sensor that detects at least one combustion characteristic value related to combustion of the engine; and a control system that determines a desired combustion characteristic value based on engine-and-vehicle operating conditions, and controls a manipulated variable of a variable valve actuation system in a manner so as to bring the detected combustion characteristic value closer to the desired combustion characteristic value; and a dynamic compensator provided to estimate, based on the detected combustion characteristic value, a manipulated variable of a fuel injection system as well as the manipulated variable of the variable valve actuation system, wherein the control system controls both of the manipulated variable of the variable valve actuation system and the manipulated variable of the fuel injection system, using the estimated manipulated variables derived by the dynamic compensator, in a manner so as to bring the detected combustion characteristic value closer to the desired combustion characteristic value.

3. A control apparatus for controlling an internal combustion engine, comprising:

a sensor that detects at least one combustion characteristic value related to combustion of the engine; and a control system that determines a desired combustion characteristic value based on engine-and-vehicle operating conditions, and controls a manipulated variable of a variable valve actuation system in a manner so as to bring the detected combustion characteristic value closer to the desired combustion characteristic value; and a dynamic compensator provided to estimate, based on the detected combustion characteristic value, a manipulated variable of a fuel injection system as well as the manipulated variable of the variable valve actuation system, wherein the control system controls both of the manipulated variable of the variable valve actuation system and the manipulated variable of the fuel injection system, using the estimated manipulated variables derived by the dynamic compensator, in a manner so as to bring the detected combustion characteristic value closer to the desired combustion characteristic value, in the presence of a combustion mode change from premixed compression ignition combustion to either one of diesel combustion and spark-ignition gasoline combustion, or in the presence of a combustion mode change from either one of diesel combustion and spark-ignition gasoline combustion to premixed compression ignition combustion.

4. A control apparatus for controlling an internal combustion engine, comprising:

a sensor that detects at least one combustion characteristic value related to combustion of the engine; and a control system that determines a desired combustion characteristic value based on engine-and-vehicle operating conditions, and controls a manipulated variable of a variable valve actuation system in a manner so as to bring the detected combustion characteristic value closer to the desired combustion characteristic value; and a dynamic compensator provided to estimate, based on the detected combustion characteristic value, the manipulated variable of the variable valve actuation system, wherein, by way of cooperative control between the variable valve actuation system and at least one of an exhaust gas recirculation (EGR) system and a super-charging system, the control system controls the manipulated variable of the variable valve actuation system and at least one of a manipulated variable of an EGR valve of the EGR system and a manipulated variable of the super-charging system, using the estimated manipulated variable derived by the dynamic compensator, in a manner so as to bring the actual combustion characteristic value closer to the desired combustion characteristic value.

5. A control apparatus for controlling an internal combustion engine, comprising:

a sensor that detects at least one combustion characteristic value related to combustion of the engine; and a control system that determines a desired combustion characteristic value based on engine-and-vehicle operating conditions, and controls a manipulated variable of a variable valve actuation system in a manner so as to bring the detected combustion characteristic value closer to the desired combustion characteristic value; and a dynamic compensator provided to estimate, based on the detected combustion characteristic value, the manipulated variable of the variable valve actuation system, wherein the control system adjusts, responsively to at least an amount of depression of an accelerator pedal, at least one of a valve lift characteristic and a valve timing characteristic both serving as the manipulated variable of the variable valve actuation system, using the estimated manipulated variable derived by the dynamic compensator, in a manner so as to bring the detected combustion characteristic value closer to the desired combustion characteristic value.

6. A control apparatus for controlling a variable valve timing control (VTC) system of a compression ignition internal combustion engine capable of changing open and closure timings of an engine valve by variably adjusting a phase of a camshaft relative to a crankshaft, comprising:

engine-and-vehicle sensors that detect at least an angular phase of the crankshaft, an angular phase of the camshaft, and a combustion characteristic value related to a state of combustion of the compression ignition internal combustion engine; and a control system comprising a state estimator that derives an estimated manipulated variable of the VTC system based on the state of combustion, for modifying an actual manipulated variable of the VTC system based on the estimated manipulated variable, said control system configured to initiate phase-retard control for the VTC system at an engine start-up point and to switch to phase-advance control at a point of time when a predetermined cranking speed has been reached and to switch again to phase-retard control for retarding the phase to a predetermined phase angle after fuel sprayed in a cylinder of the compression ignition internal combustion engine has been ignited, while observing the state of combustion.

7. The control apparatus as claimed in claim 6, wherein:

said control system comprises a combustion control system with variable valve timing control system interaction, configured to lower a compression pressure of the compression ignition internal combustion engine by initiating the phase-retard control at the engine start-up point and to rise the compression pressure of the compression ignition internal combustion engine by switching to the phase-advance control at the point of time when the predetermined cranking speed has been reached and to lower an effective compression ratio of the compression ignition internal combustion engine by switching again to the phase-retard control for retarding the phase to the predetermined phase angle after the sprayed fuel has been ignited, while observing the state of combustion.

8. A control apparatus for controlling an internal combustion engine, comprising:

a sensor that detects a cylinder pressure in a cylinder of the engine; and control system comprising:

(1) an engine model section that sets an actual combustion characteristic value based on the detected cylinder pressure and sets a desired combustion characteristic value based on engine-and-vehicle operating conditions, and calculates a deviation of the actual combustion characteristic value from the desired combustion characteristic value; and (2) an engine manipulated variable setting section that sets at least one engine manipulated variable based on the desired combustion characteristic value; and said control system modifying the engine manipulated variable based on the deviation between the actual combustion characteristic value and the desired combustion characteristic value, when the actual combustion characteristic value changes owing to a change in the engine manipulated variable.

* * * * *